(12) United States Patent
Eagan et al.

(10) Patent No.: US 11,230,625 B2
(45) Date of Patent: Jan. 25, 2022

(54) END-GROUP ISOMERIZATION OF POLY(ALKYLENE CARBONATE) POLYMERS

(71) Applicant: Saudi Aramco Technologies Company, Dhahran (SA)

(72) Inventors: James Eagan, Austin, TX (US); Christopher A. Simoneau, Oxford, CT (US); Jay J. Farmer, Ithaca, NY (US)

(73) Assignee: Saudi Aramco Technologies Company, Dhahran (SA)

(*) Notice: Subject to any disclaimer, the term of this patent is extended or adjusted under 35 U.S.C. 154(b) by 274 days.

(21) Appl. No.: 16/387,788

(22) Filed: Apr. 18, 2019

(65) Prior Publication Data

US 2019/0322802 A1    Oct. 24, 2019

Related U.S. Application Data

(60) Provisional application No. 62/711,318, filed on Jul. 27, 2018, provisional application No. 62/659,684, filed on Apr. 18, 2018.

(51) Int. Cl.
| | | |
|---|---|---|
| *C08G 64/40* | (2006.01) | |
| *C08G 64/02* | (2006.01) | |
| *C08G 64/34* | (2006.01) | |
| *B01J 21/02* | (2006.01) | |
| *B01J 35/00* | (2006.01) | |
| *B01J 31/04* | (2006.01) | |

(52) U.S. Cl.
CPC .............. *C08G 64/40* (2013.01); *B01J 21/02* (2013.01); *B01J 31/04* (2013.01); *B01J 35/0006* (2013.01); *C08G 64/0208* (2013.01); *C08G 64/34* (2013.01); *B01J 2231/52* (2013.01); *B01J 2531/002* (2013.01)

(58) Field of Classification Search
USPC .......................... 528/196, 198, 501; 502/117
See application file for complete search history.

(56) References Cited

U.S. PATENT DOCUMENTS

| | | | |
|---|---|---|---|
| 3,248,415 A | 4/1966 | Stevens et al. | |
| 4,686,276 A | 8/1987 | Myers | |
| 4,826,953 A | 5/1989 | Kuyper et al. | |
| 5,637,739 A | 6/1997 | Jacobsen et al. | |
| 5,663,393 A | 9/1997 | Jacobsen et al. | |
| 5,665,890 A | 9/1997 | Jacobsen et al. | |
| 5,929,232 A | 7/1999 | Jacobsen et al. | |
| 6,130,340 A | 10/2000 | Jacobsen et al. | |
| 6,309,997 B1 | 10/2001 | Fujita et al. | |
| 6,639,087 B2 | 10/2003 | Larrow et al. | |
| 6,844,448 B2 | 1/2005 | Jacobsen et al. | |
| 6,884,750 B2 | 4/2005 | Kim et al. | |
| 6,903,043 B2 | 6/2005 | Kim et al. | |
| 7,145,022 B2 | 12/2006 | Luinstra et al. | |
| 7,244,805 B2 | 7/2007 | Park et al. | |
| 7,858,729 B2 | 12/2010 | Allen | |
| 8,163,867 B2 | 4/2012 | Lee et al. | |
| 8,207,365 B2 | 6/2012 | Zheng et al. | |
| 8,232,267 B2 | 7/2012 | Groves | |
| 8,247,520 B2 | 8/2012 | Allen et al. | |
| 8,252,891 B2 | 8/2012 | Cherian et al. | |
| 8,252,955 B2 | 8/2012 | Gao et al. | |
| 8,324,337 B2 | 12/2012 | Allen | |
| 8,461,290 B2 | 6/2013 | Carpentier et al. | |
| 8,470,956 B2 | 6/2013 | Allen et al. | |
| 8,507,733 B2 | 8/2013 | Ok et al. | |
| 8,580,911 B2 | 11/2013 | Allen et al. | |
| 8,598,309 B2 | 12/2013 | Jeong et al. | |
| 8,604,155 B2 | 12/2013 | Allen et al. | |
| 8,642,721 B2 | 2/2014 | Ok et al. | |
| 8,785,591 B2 | 7/2014 | Allen et al. | |
| 8,791,274 B2 | 7/2014 | Ok et al. | |
| 8,921,508 B2 | 12/2014 | Allen et al. | |
| 8,952,104 B2 | 2/2015 | Allen | |
| 9,012,675 B2 | 4/2015 | Allen et al. | |
| 9,023,979 B2 | 5/2015 | Jeong et al. | |
| 9,029,498 B2 | 5/2015 | Allen et al. | |
| 9,102,800 B2 | 8/2015 | Allen et al. | |
| 9,376,531 B2 | 6/2016 | Allen et al. | |
| 9,388,277 B2 | 7/2016 | Farmer | |
| 9,399,701 B2 | 7/2016 | Allen et al. | |
| 9,422,397 B2 | 8/2016 | Allen et al. | |
| 9,453,100 B2 | 9/2016 | Allen et al. | |
| 9,512,259 B2 | 12/2016 | Allen et al. | |
| 9,809,678 B2 | 11/2017 | Allen et al. | |

(Continued)

FOREIGN PATENT DOCUMENTS

| | | |
|---|---|---|
| CN | 105542142 B | 6/2017 |
| CN | 107868239 A | 4/2018 |

(Continued)

OTHER PUBLICATIONS

ASTM D4273-99. Standard Test Methods for Polyurethane Raw Materials: Determination of Primary Hydroxyl Content of Polyether Polyols, 7 pages (retrieved Jun. 27, 2019).

(Continued)

*Primary Examiner* — Terressa Boykin
(74) *Attorney, Agent, or Firm* — Charles E. Lyon; John P. Rearick; Michael A. Shinall

(57) ABSTRACT

Described herein are methods of preparing poly(alkylene carbonate) polymers comprising an increased ratio of primary hydroxyl end groups to secondary hydroxyl end groups, and compositions thereof.

22 Claims, 17 Drawing Sheets

(56) References Cited

U.S. PATENT DOCUMENTS

| | | | |
|---|---|---|---|
| 9,834,710 B2 | 12/2017 | Allen et al. | |
| 9,850,345 B2 | 12/2017 | Farmer | |
| 9,868,816 B2 | 1/2018 | Allen et al. | |
| 9,884,937 B2 | 2/2018 | Allen et al. | |
| 9,994,760 B2 | 6/2018 | Allen et al. | |
| 10,047,188 B2 | 8/2018 | Allen et al. | |
| 10,138,369 B2 | 11/2018 | Allen et al. | |
| 10,301,426 B2 | 5/2019 | Allen et al. | |
| 10,308,759 B2 | 6/2019 | Simoneau | |
| 10,351,654 B2 | 7/2019 | Allen et al. | |
| 10,392,556 B2 | 8/2019 | Allen et al. | |
| 10,428,173 B2 | 10/2019 | Allen et al. | |
| 10,836,859 B2 | 11/2020 | Allen et al. | |
| 10,982,036 B2 | 4/2021 | Allen et al. | |
| 11,021,564 B2 | 6/2021 | Allen et al. | |
| 11,059,969 B2 | 7/2021 | Allen et al. | |
| 2003/0176622 A1* | 9/2003 | Konishi | C08G 18/44 528/196 |
| 2006/0089252 A1 | 4/2006 | Coates et al. | |
| 2010/0256329 A1 | 10/2010 | Nozaki et al. | |
| 2013/0274401 A1 | 10/2013 | Allen et al. | |
| 2013/0296450 A1 | 11/2013 | Hofmann et al. | |
| 2014/0249279 A1 | 9/2014 | Williams et al. | |
| 2015/0344751 A1 | 12/2015 | Allen et al. | |
| 2016/0115288 A1 | 4/2016 | Waddington | |
| 2019/0100648 A1 | 4/2019 | Allen et al. | |
| 2019/0233586 A1 | 8/2019 | Allen et al. | |
| 2020/0048399 A1 | 2/2020 | Allen et al. | |
| 2020/0062900 A1 | 2/2020 | Farmer | |
| 2020/0095375 A1 | 3/2020 | Allen et al. | |
| 2020/0095494 A1 | 3/2020 | Allen et al. | |
| 2020/0325296 A1 | 10/2020 | Waddington | |
| 2021/0171708 A1 | 6/2021 | Allen et al. | |

FOREIGN PATENT DOCUMENTS

| | | |
|---|---|---|
| EP | 0222453 A2 | 5/1987 |
| EP | 0403313 A2 | 12/1990 |
| EP | 2258745 A1 | 12/2010 |
| EP | 2146977 B1 | 11/2012 |
| EP | 2257559 B1 | 10/2014 |
| JP | 2008-081518 | 4/2008 |
| JP | 2008-280399 A | 11/2008 |
| WO | WO-98/04538 A1 | 2/1998 |
| WO | WO-99/00444 A1 | 1/1999 |
| WO | WO-2008/136591 A1 | 11/2008 |
| WO | WO-2009/148889 A2 | 12/2009 |
| WO | WO-2010/013948 A2 | 2/2010 |
| WO | WO-2010/022388 A2 | 2/2010 |
| WO | WO-2010/028362 A1 | 3/2010 |
| WO | WO-2010/033703 A1 | 3/2010 |
| WO | WO-2010/033705 A1 | 3/2010 |
| WO | WO-2010/062703 A1 | 6/2010 |
| WO | WO-2010/147421 A2 | 12/2010 |
| WO | WO-2011/005664 A2 | 1/2011 |
| WO | WO-2012/027725 A1 | 3/2012 |
| WO | WO-2012/037282 A2 | 3/2012 |
| WO | WO-2012/071505 A1 | 5/2012 |
| WO | WO-2012/094619 A1 | 7/2012 |
| WO | WO-2012/154849 A1 | 11/2012 |
| WO | WO-2013/012895 A1 | 1/2013 |
| WO | WO-2013/016331 A2 | 1/2013 |
| WO | WO-2013/022932 A1 | 2/2013 |
| WO | WO-2013/096602 A1 | 6/2013 |
| WO | WO-2013/158621 A1 | 10/2013 |
| WO | WO-2013/177546 A2 | 11/2013 |
| WO | WO-2014/031811 A1 | 2/2014 |
| WO | WO-2014/074706 A1 | 5/2014 |
| WO | WO-2014/186397 A1 | 11/2014 |
| WO | WO-2015/154001 A1 | 10/2015 |
| WO | WO-2016/012785 A1 | 1/2016 |
| WO | WO-2016/012786 A1 | 1/2016 |
| WO | WO-2019/204553 A1 | 10/2019 |

OTHER PUBLICATIONS

Chisholm, M.H. and Zhou, Z., Concerning the Mechanism of the Ring Opening of Propylene Oxide in the Copolymerization of Propylene Oxide and Carbon Dioxide to Give Poly(propylene carbonate), J. Am. Chem. Soc., 126: 11030-11039 (2004).

Chisholm, M.H. et al., Poly(propylene carbonate). 1. More about Poly(propylene carbonate) Formed from the Copolymerization of Propylene Oxide and Carbon Dioxide Employing a Zinc Glutarate Catalyst, Macromolecules, 35: 6494-6504 (2002).

Grasa, G. A. et al., Transesterification/Acylation Reactions Catalyzed by Molecular Catalysts, Synthesis, 7, 971-985 (2004).

Ionescu, M., Chemistry and Technology of Polyols for Polyurethanes, Rapra Technology Ltd., pp. 17-19 (2005).

Lu, X-B. and Wang, Y., Highly Active, Binary Catalyst Systems for the Alternating Copolymerization of $CO_2$ and Epoxides under Mild Conditions, Angew. Chem. Int. Ed., 43: 3574-3577 (2004).

Otera, J., Transesterification, Chem. Rev., 93(4): 1449-1470 (1993).

Taherimehr, M. and Pescarmona, P.P., Green Polycarbonates Prepared by the Copolymerization of $CO_2$ with Epoxides, J. Appl. Polym. Sci., 41141: 1-7 (2014).

Wei, R-J. et al., Highly Regioselective and Alternating Copolymerization of Racemic Styrene Oxide and Carbon Dioxide via Heterogeneous Double Metal Cyanide Complex Catalyst, Macromolecules, 46: 3693-3697 (2013).

U.S. Appl. No. 17/095,827, filed Nov. 12, 2020, Allen et al.

U.S. Appl. No. 17/195,740, filed Mar. 9, 2021, Allen et al.

Inoue, S., Immortal Polymerization: The Outset, Development, and Application, Journal of Polymer Science: Part A: Polymer Chemistry, 38: 2861-2871 (2000).

International Search Report for PCT/US2019/028035, 4 pages (dated Jul. 29, 2019).

Ionescu, M., Chemistry and Technology of Polyols for Polyurethanes, Rapra Technology Limited, 605 pages (2005).

Nakano, K. et al., Selective Formation of Polycarbonate over Cyclic Carbonate: Copolymerization of Epoxides with Carbon Dioxide Catalyzed by a Cobalt (III) Complex with a Piperidinium End-Capping Arm, Angew. Chem. Int. Ed., 45: 7274-7277 (2006).

Nakano, K. et al., Supporting Information, 12 pages (2006). Selective Formation of Polycarbonate over Cyclic Carbonate: Copolymerization of Epoxides with Carbon Dioxide Catalyzed by a Cobalt (III) Complex with a Piperidinium End-Capping Arm, Angew. Chem. Int. Ed., 45: 7274-7277 (2006).

Noordover, B.A.J., Biobased step-growth polymers: chemistry, functionality and applicability, Eindhoven University of Technology, 219 pages (Published Jan. 1, 2008). [Download date Apr. 20, 2018].

Smith, C. P. et al., Thermoplastic Polyurethane Elastomers Made from High Molecular Weight POLY-L® Polyols, Journal of Elastomers and Plastics, 24: 306-322 (1992).

Sujith et al., A Highly Active and Recyclable Catalytic System for $CO_2$/Propylene Oxide Copolymerization, Angew. Chem. Int. Ed., 47: 7306-7309 (2008).

Sujith et al., A Highly Active and Recyclable Catalytic System for $CO_2$/Propylene Oxide Copolymerization, Angew. Chem. Int. Ed., 47: 7306-7309 (2008). Supporting Information.

Van Meerendonk, W.J. et al., Unexpected Side Reactions and Chain Transfer for Zinc-Catalyzed Copolymerization of Cyclohexene Oxide and Carbon Dioxide, Macromolecules, 38: 7306-7313 (2005).

Written Opinion for PCT/US2019/028035, 8 pages (dated Jul. 29, 2019).

\* cited by examiner

US 11,230,625 B2

END-GROUP ISOMERIZATION OF POLY(ALKYLENE CARBONATE) POLYMERS

CROSS-REFERENCE TO RELATED APPLICATIONS

The present application claims priority to U.S. provisional application No. 62/659,684, filed Apr. 18, 2018, and U.S. provisional application No. 62/711,318, filed Jul. 27, 2018, the entirety of each of which is hereby incorporated by reference.

BACKGROUND

Poly(alkylene carbonate) polymers, particularly, those produced by direct incorporation of $CO_2$ are of increasing interest as sustainable materials in a wide range of applications. Poly(alkylene carbonate) polyols, and in particular poly(propylene carbonate) polyols find increasing utility as high performance materials for use in the field of polyurethane chemistry. Poly(alkylene carbonate) polyols are used as precursors for polyurethanes, and their compositions inform the properties of the polyurethane compositions that are ultimately provided. Poly(alkylene carbonate) polyols are incorporated into the polyurethane products by a reaction of their —OH end groups with polyisocyanates (compounds having two or more —NCO moieties) to form urethane linkages.

The regiochemistry of the hydroxyl end group of the poly(alkylene carbonate) polyol plays an important role in the reaction rate with the isocyanate. In particular, the reaction between a primary hydroxyl end group and an isocyanate is known to occur at a faster rate than a secondary hydroxyl end group and an isocyanate. See Ionescu, M. Chemistry and Technology of Polyols for Polyurethanes, 2005, Rapra Technology Ltd. Therefore, it is beneficial to use polymers that have primary hydroxyl end groups for many polyurethane applications.

The regiochemistry of hydroxyl end groups on polyols derived from substituted epoxides (primary vs. secondary) is often dependent upon the choice of polymerization catalyst. Catalysts have varying regioselectivities, and many polymer compositions, therefore, comprise a mixture of polymer molecules having primary and secondary hydroxyl end groups. For example, as noted in U.S. Patent Application Publication No. 2013/0296450, long-chain polyether polyols prepared from epoxides using a double metal cyanide catalyst will predominantly result in polyethers containing secondary hydroxyl groups, and that "long-chain polyether polyols with predominantly primary [hydroxyl] end groups are thus not accessible" by the use of such double metal cyanide catalysts (U.S. Patent Application Publication No. 2013/0296450, paragraph [0002]). Some have tried to solve the problem of preparing polymers having predominantly primary hydroxyl groups by further reacting the polymer to introduce end caps and thereby generate the primary hydroxyl group; see, for example, U.S. Patent Application Publication No. 2013/0296450. Such processes are not optimal since they rely on further reaction steps after polymerization, for example by (1) reacting the initial polyol product with a cyclic carboxylic acid anhydride; and (2) further reacting the anhydride-treated material with ethylene oxide in the presence of a catalyst. There remains a need, however, for an efficient, simple process to reliably prepare poly (alkylene carbonate) polymers having an increased primary hydroxyl end group content.

SUMMARY

The present disclosure provides, in some embodiments, methods for increasing a ratio of primary to secondary hydroxyl (OH) end groups of a poly(alkylene carbonate) polymer (e.g., a poly(propylene carbonate) polymer) composition, the method comprising a step of isomerizing (e.g., isomerization promoted by heating) a starting poly(alkylene carbonate) polymer composition to provide a modified poly (alkylene carbonate) polymer composition wherein the modified poly(alkylene carbonate) polymer composition has a higher ratio of primary to secondary —OH end groups than the starting poly(alkylene carbonate) polymer composition.

In some embodiments, the present disclosure provides a method for increasing the ratio of primary to secondary OH end groups of a poly(alkylene carbonate) (e.g., a poly (propylene carbonate)) polymer composition, the method comprising a step of contacting a starting poly(alkylene carbonate)polymer composition with an isomerization catalyst to provide a modified poly(alkylene carbonate)polymer composition wherein the modified poly(alkylene carbonate) polymer composition has a higher ratio of primary to secondary OH end groups than the starting poly(alkylene carbonate)polymer composition.

Further, in some embodiments, the present disclosure provides a poly(alkylene carbonate) (e.g., a poly(propylene carbonate)) polymer composition comprising a plurality of poly(alkylene carbonate) polymer chains, wherein the poly (alkylene carbonate) chains contain substituted ethylene moieties (e.g., derived from epoxide monomers) separated by carbonate linkages and characterized in that the degree of regioregularity for intramolecular alkylene moieties within poly(alkylene carbonate) polymer chains is higher than the regioregularity for at least one chain terminus.

BRIEF DESCRIPTION OF THE DRAWING

(FIG. 4A); 70° C. (FIG. 4B); and 80° C. (FIG. 4C).

DEFINITIONS

Figure 1:
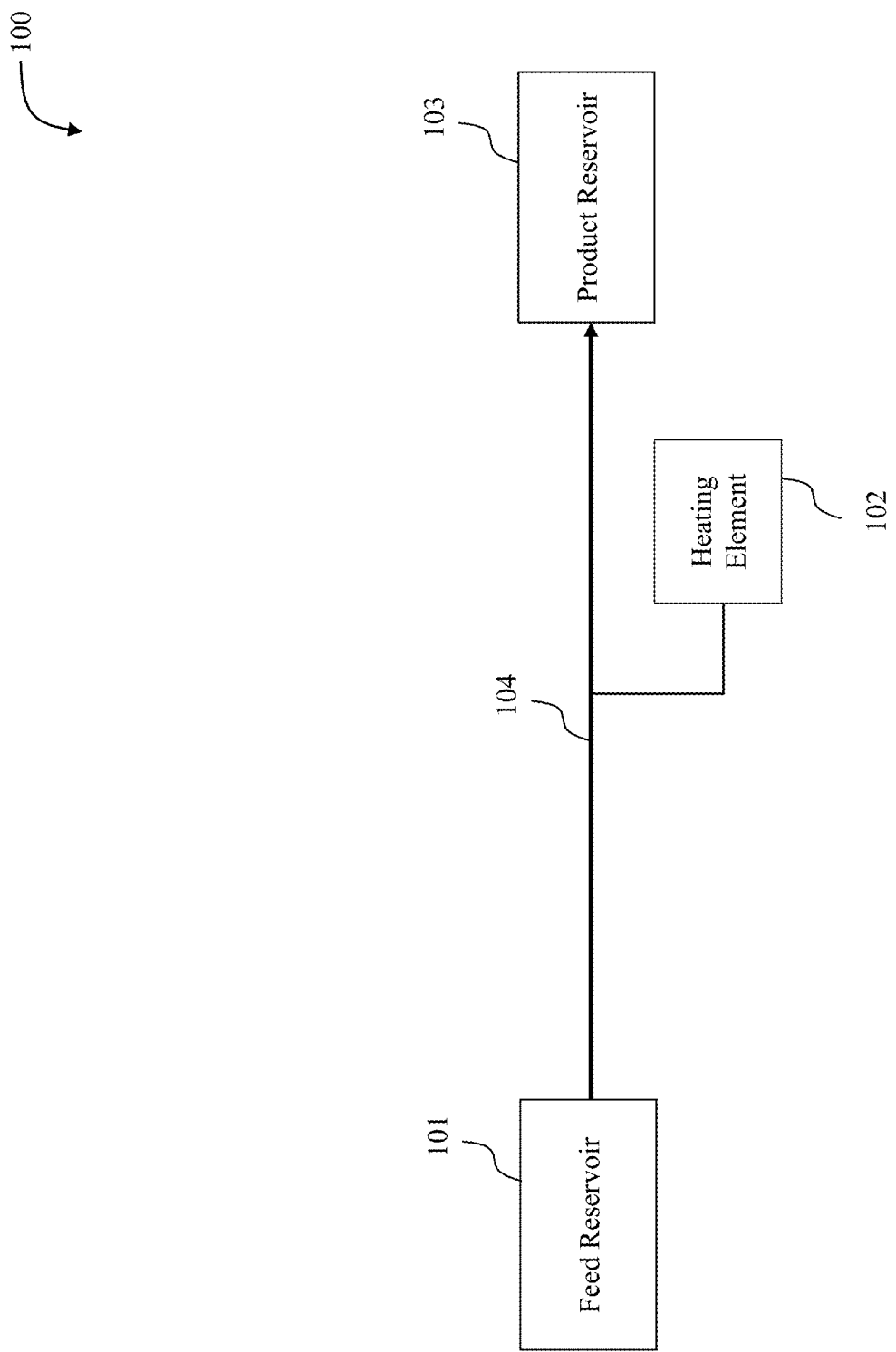
FIG. 1 is an illustration of an apparatus for heating a poly(alkylene carbonate) polymer.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a compound may, in some embodiments, be provided substantially free of one or more corresponding stereoisomers, and may also be referred to as "stereochemically enriched."

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group," as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. As used herein the terms "aliphatic" or "aliphatic group", also encompass partially fluorinated and perfluoro analogs of these moieties where at least one of the hydrogen atoms of the aliphatic group is replaced by a fluorine atom. Unless otherwise specified, aliphatic groups contain 1-32 carbon atoms. In certain embodiments, aliphatic groups contain 1-28 carbon atoms. In certain embodiments, aliphatic groups contain 1-24 carbon atoms. In certain embodiments, aliphatic groups contain 1-20 carbon atoms. In certain embodiments, aliphatic groups contain 1-16 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, means aliphatic groups wherein one or more carbon atoms are independently replaced by one or more of oxygen, sulfur, nitrogen, or phosphorus. In certain embodiments, one or two carbon atoms are independently replaced by one or more of oxygen, sulfur, nitrogen, or phosphorus. Heteroaliphatic groups may be substituted or unsubstituted, branched or unbranched, cyclic or acyclic, and include "heterocycle," "heterocyclyl," "heterocycloaliphatic," or "heterocyclic" groups.

The term "epoxide" or "alkylene oxide," as used herein, refers to a substituted or unsubstituted oxirane. Substituted oxiranes include monosubstituted oxiranes, disubstituted oxiranes, trisubstituted oxiranes, and tetrasubstituted oxiranes. Such epoxides may be further optionally substituted as defined herein.

The term "unsaturated," as used herein, means that a moiety has one or more double or triple bonds.

The term "cycloaliphatic," used alone or as part of a larger moiety, refer to saturated or partially unsaturated cyclic aliphatic monocyclic, bicyclic, or polycyclic ring systems, as described herein, having from 3 to 14 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic," may also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic groups is bicyclic. In some embodiments, a carbocyclic group is tricyclic. In some embodiments, a carbocyclic group is polycyclic.

The term "alkyl," as used herein, refers to saturated, straight- or branched-chain hydrocarbon radicals derived by removal of a single hydrogen atom from an aliphatic moiety containing between one and twelve carbon atoms. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight or branched-chain aliphatic moiety having at least one carbon-carbon double bond. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, butadienyl, 1-methyl-2-buten-1-yl, and the like.

The term "alkynyl," as used herein, refers to a monovalent group derived from a straight- or branched-chain aliphatic moiety having at least one carbon-carbon triple bond Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "cycloalkyl," as used herein, refers to monocyclic and polycyclic moieties wherein the rings contain only carbon atoms. Unless otherwise specified, carbocycles may be saturated, partially unsaturated or aromatic, and contain 3 to 20 carbon atoms. In some embodiments, a carbocycle is aliphatic. Representative carbocyles include cyclopropane, cyclobutane, cyclopentane, cyclohexane, bicyclo[2.2.1]heptane, norbornene, phenyl, cyclohexene, naphthalene, and spiro[4.5]decane.

The term "aryl" used alone or as part of a larger moiety as in "aralkyl," "aralkoxy," or "aryloxyalkyl," refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring." In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl," as it is used herein, is a group in which an aromatic ring is fused to one or more additional rings, such as benzofuranyl, indanyl, phthalimidyl, naphthimidyl, phenantriidinyl, or tetrahydronaphthyl, and the like.

The terms "heteroaryl" and "heteroar-," used alone or as part of a larger moiety, e.g., "heteroaralkyl" or "heteroaralkoxy," refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring," "heteroaryl group," or "heteroaromatic," any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle," "heterocyclyl," "heterocyclic radical," and "heterocyclic ring" are used interchangeably and refer to a stable 5- to 7-membered monocyclic or 7-14-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or +NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical" are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted"

group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

In some chemical structures herein, substituents are shown attached to a bond which crosses a bond in a ring of the depicted molecule. This means that one or more of the substituents may be attached to the ring at any available position (usually in place of a hydrogen atom of the parent structure). In cases where an atom of a ring so substituted has two substitutable positions, two groups may be present on the same ring atom. When more than one substituent is present, each is defined independently of the others, and each may have a different structure. In cases where the substituent shown crossing a bond of the ring is —R, this has the same meaning as if the ring were said to be "optionally substituted" as described in the preceding paragraph.

Suitable monovalent substituents on a substitutable carbon atom of an "optionally substituted" group are independently halogen; —(CH$_2$)$_{0-4}$R$^\circ$; —(CH$_2$)$_{0-4}$R$^\circ$; —(CH$_2$)$_{0-4}$Si(R$^\circ$)$_3$; —O—(CH$_2$)$_{0-4}$C(O)OR$^\circ$; —(CH$_2$)$_{0-4}$CH(OR$^\circ$)$_2$; —(CH$_2$)$_{0-4}$SR$^\circ$; —(CH$_2$)$_{0-4}$Ph, which may be substituted with R$^\circ$; —(CH$_2$)$_{0-4}$O(CH$_2$)$_{0-1}$Ph which may be substituted with R$^\circ$; —CH═CHPh, which may be substituted with R$^\circ$; —NO$_2$; —CN; —NCO; —N$_3$; —(CH$_2$)$_{0-4}$N(R$^\circ$)$_2$; —(CH$_2$)$_{0-4}$N(R$^\circ$)C(O)R$^\circ$; —N(R$^\circ$)C(S)R$^\circ$; —(CH$_2$)$_{0-4}$N(R$^\circ$)C(O)NR$^\circ_2$; —N(R$^\circ$)C(S)NR$^\circ_2$; —(CH$_2$)$_{0-4}$N(R$^\circ$)C(O)OR$^\circ$; —N(R$^\circ$)N(R$^\circ$)C(O)R$^\circ$; —N(R$^\circ$)N(R$^\circ$)C(O)NR$^\circ_2$; —N(R$^\circ$)N(R$^\circ$)C(O)OR$^\circ$; —(CH$_2$)$_{0-4}$C(O)R$^\circ$; —C(S)R$^\circ$; —(CH$_2$)$_{0-4}$C(O)OR$^\circ$; —(CH$_2$)$_{0-4}$C(O)SR$^\circ$; —(CH$_2$)$_{0-4}$C(O)OSiR$^\circ_3$; —(CH$_2$)$_{0-4}$OC(O)R$^\circ$; —OC(O)(CH$_2$)$_{0-4}$SR$^\circ$; —SC(S)SR$^\circ$; —(CH$_2$)$_{0-4}$SC(O)R$^\circ$; —(CH$_2$)$_{0-4}$C(O)NR$^\circ_2$; —C(S)NR$^\circ_2$; —C(S)SR$^\circ$; —SC(S)SR$^\circ$, —(CH$_2$)$_{0-4}$OC(O)NR$^\circ_2$; —C(O)N(OR$^\circ$)R$^\circ$; —C(O)C(O)R$^\circ$; —C(O)CH$_2$C(O)R$^\circ$; —C(NOR$^\circ$)R$^\circ$; —(CH$_2$)$_{0-4}$SSR$^\circ$; —(CH$_2$)$_{0-4}$S(O)$_2$R$^\circ$; —(CH$_2$)$_{0-4}$S(O)$_2$OR$^\circ$; —(CH$_2$)$_{0-4}$OS(O)$_2$R$^\circ$; —S(O)$_2$NR$^\circ_2$; —(CH$_2$)$_{0-4}$S(O)R$^\circ$; —N(R$^\circ$)S(O)$_2$NR$^\circ_2$; —N(R$^\circ$)S(O)$_2$R$^\circ$; —N(OR$^\circ$)R$^\circ$; —C(NH)NR$^\circ_2$; —P(O)$_2$R$^\circ$; —P(O)R$^\circ_2$; —OP(O)R$^\circ_2$; —OP(O)(OR$^\circ$)$_2$; SiR$_3$; —(C$_{1-4}$ straight or branched alkylene)O—N(R$^\circ$)$_2$; or —(C$_{1-4}$ straight or branched alkylene)C(O)O—N(R$^\circ$)$_2$, wherein each R$^\circ$ may be substituted as defined below and is independently hydrogen, C$_{1-6}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R$^\circ$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on R$^\circ$ (or the ring formed by taking two independent occurrences of R$^\circ$ together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet_2$, —NO$_2$, —SiR$^\bullet_3$, —OSiR$^\bullet_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^\circ$ include ═O and ═S.

Suitable divalent substituents on a saturated carbon atom of an "optionally substituted" group include the following: ═O, ═S, ═NNR*$_2$, ═NNHC(O)R*, ═NNHC(O)OR*, ═NNHS(O)$_2$R*, ═NR*, ═NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger_2$, —C(S)NR$^\dagger_2$, —C(NH)NR$^\dagger_2$, or —N(R$^\dagger$)S(O)$_2$R$^\dagger$; wherein each R$^\dagger$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^\dagger$ are independently halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

As used herein, the term "isolated" refers to a substance and/or entity that has been (1) separated from at least some of the components with which it was associated when initially produced, and/or (2) designed, produced, prepared, and/or manufactured by the hand of man. Isolated substances and/or entities may be separated from about 10%, about 20%, about 30%, about 40%, about 50%, about 60%, about 70%, about 80%, about 90%, about 91%, about 92%, about 93%, about 94%, about 95%, about 96%, about 97%, about 98%, about 99%, or more than about 99% of the other components with which they were initially associated. In some embodiments, isolated agents are about 80%, about 85%, about 90%, about 91%, about 92%, about 93%, about 94%, about 95%, about 96%, about 97%, about 98%, about 99%, or more than about 99% pure. As used herein, a substance is "pure" or "purified" if it is substantially free of other components. In some embodiments, as will be understood by those skilled in the art, a substance may still be considered "isolated" or even "pure", after having been combined with certain other components such as, for example, one or more carriers (e.g., solvent, water, etc.); in such embodiments, percent isolation or purity of the substance is calculated without including such carriers.

The term "substantially free", unless otherwise indicated, means less than about 5 percent by weight of a composition. In some embodiments, a composition that is substantially free of a substance contains less than about 2 percent by weight of the substance in the composition. In some embodiments, a composition that is substantially free of a substance contains less than about 1 percent by weight of the substance in the composition. In some embodiments, a composition that is substantially free of a substance contains less than about 0.1 percent by weight of the substance in the composition. In some embodiments, a composition that is substantially free of a substance contains less than about 0.01 percent by weight of the substance in the composition. In some embodiments, a composition that is substantially free of a substance contains less than about 0.001 percent by weight of the substance in the composition. In some embodiments, a composition that is substantially free of a substance contains less than an amount of the substance than can be measured by standard techniques.

As used herein, the "term head-to-tail" refers to the regiochemistry of adjacent repeating units in a polymer chain. For example, in the context of poly(propylene carbonate) (PPC), the term head-to-tail is based on the regiochemical possibilities depicted below in Scheme 2.

The term "regioselective," unless otherwise indicated, refers to the preference of one direction of chemical bond making or breaking over another in a given catalytic system. For example, during copolymerization of substituted epoxides (e.g., propylene oxide) and $CO_2$, a growing polymer chain can attack an epoxide at one of two positions: the "head" carbon atom or the "tail" carbon atom:

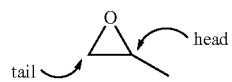

Preference for reaction at one carbon atom over the other is an example of regioselective bond formation.

The term "regioisomer," unless otherwise indicated, refers to molecules having the same molecular formula, but different connectivity. For example, the formula $C_3H_7Br$ has two regioisomers: 1-bromopropane and 2-bromopropane:

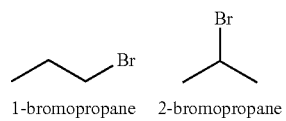

1-bromopropane  2-bromopropane

The term "regioregular," unless otherwise indicated, refers to a polymer molecule wherein the regiochemistry of monomer enchainment is consistent through the polymer chain. For example, during copolymerization of a substituted alkylene oxide (e.g., propylene oxide) and $CO_2$, if the growing polymer chain predominantly attacks the tail carbon atom (i.e., regioselectively forms consecutive units of 1,2-propane-diol separated by carbonate linkages, otherwise referred to as "head-to-tail"), the polymer will be regioregular. An example of a regioregular head-to-tail segment of polymer comprising monomers derived from propylene oxide and $CO_2$ is represented by:

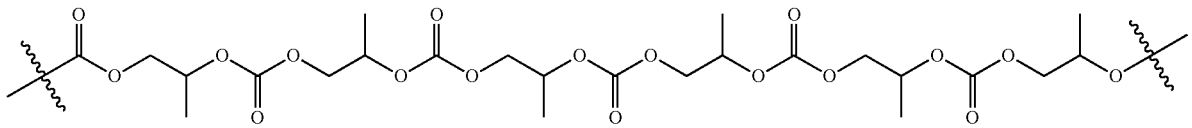 [SMILES: *OC(C)COC(=O)OC(C)COC(=O)OC(C)COC(=O)OC(C)COC(=O)OC(C)COC(=O)OC(C)COC(*)=O]

As used herein, regioregular polymers are those that comprise at least two consecutive carbonate units arranged in head-to-tail enchainment. A poly(alkylene carbonate) polymer comprising entirely head-to-tail enchainment is referred to as having 100% regioregularity.

DETAILED DESCRIPTION

The present disclosure provides, among other things, methods useful for increasing the ratio of primary to secondary hydroxyl (OH) end groups of poly(alkylene carbonate) polymers. For example, the present disclosure encompasses the recognition that heating a poly(alkylene carbonate) polymer, optionally in the presence of a copolymerization catalyst, increases the molar ratio of primary OH end groups on the polymer, presumably via an isomerization mechanism at the polymer chain terminus. In some embodiments, the present disclosure provides a method for increasing the ratio of primary to secondary hydroxyl (OH) end groups of a poly(alkylene carbonate) polymer (e.g., poly (propylene carbonate) ("PPC") polymer) composition, the method comprising the step of isomerizing (e.g., isomerization promoted by heating) a starting poly(alkylene carbonate) polymer composition to provide a modified poly(alkylene carbonate) polymer composition wherein the modified poly(alkylene carbonate) polymer composition has a higher ratio of primary to secondary —OH end groups than the starting poly(alkylene carbonate) polymer composition.

The present disclosure also encompasses the recognition that certain catalysts, "isomerization catalysts," when contacted with a poly(alkylene carbonate) polymer, can increase the molar ratio of primary OH end groups to secondary OH end groups. In some embodiments, the present disclosure provides a method for increasing the ratio of primary to secondary OH end groups of a poly(alkylene carbonate) (e.g., a poly(propylene carbonate)) polymer composition, the method comprising a step of contacting a starting poly(alkylene carbonate) polymer composition with an isomerization catalyst to provide a modified poly(alkylene carbonate) polymer composition wherein the modified poly(alkylene carbonate) polymer composition has a higher ratio of primary to secondary OH end groups than the starting poly(alkylene carbonate) polymer composition.

In some embodiments, the present disclosure provides a poly(alkylene carbonate) polymer (e.g., a poly(propylene carbonate)) composition comprising a plurality of poly(alkylene carbonate) polymer chains, where the poly(alkylene carbonate) chains contain substituted ethylene (e.g., isopropylene) moieties separating each carbonate linkage, characterized in that a percentage of intrapolymer adjacent substituted ethylene moieties are arranged in a head-to-tail enchainment, and a percentage of secondary OH end groups is less than a percentage of intrapolymer carbonate units arranged in a head-to-tail enchainment.

In some embodiments, the present disclosure provides a poly(alkylene carbonate) polymer (e.g., a poly(propylene carbonate)) composition comprising a plurality of poly(alkylene carbonate) polymer chains, where the poly(alkylene carbonate) chains contain substituted ethylene (e.g., isopropylene) moieties separating each carbonate linkage, characterized in that a percentage of intrapolymer adjacent substituted ethylene moieties are arranged in a tail-to-tail enchainment, and a percentage of secondary OH end groups is less than a percentage of intrapolymer carbonate units arranged in a tail-to-tail enchainment.

In some embodiments, the present disclosure provides a poly(alkylene carbonate) polymer (e.g., poly(propylene carbonate) composition comprising a plurality of poly(alkylene carbonate) polymer chains, wherein the poly(alkylene carbonate) chains contain substituted ethylene moieties separating each carbonate linkage and are characterized in that the degree of regioregularity for substituted ethylene (e.g., propylene) moieties within the polymer chains is higher than the regioregularity for at least one chain terminus (i.e. wherein a chain terminus is a penultimate substituted ethylene monomer unit and a terminal substituted ethylene monomer unit separated by a carbonate linkage). Stated another way, such polymers are characterized in that the intrapolymer regioregularity is higher than the chain terminus regioregularity as shown below:

groups. Polyurethane synthesis often involves blending polyols comprising different degrees of primary versus secondary hydroxyl end groups, which can become problematic because such polyols will react at different rates with the isocyanate reagents used to prepare the polyurethanes. This requires that a more complex process be employed to balance the reaction rate of the polyol components, e.g. a prepolymer or "two shot" process. However, a "one-shot process" where all polyols are reacted together with the isocyanate is more convenient, but is only practical when each polyol component has a similar reactivity. Optimally, such a composition comprises primary OH end group regiochemistry (e.g., all polyols comprise predominantly primary OH end groups).

Many known polymerization methods used to prepare poly(alkylene carbonate) polymer precursors, however, produce polymer compositions wherein a significant portion or even a majority of polymer molecules comprise secondary hydroxyl end groups, making them inefficient for polyurethane synthesis and/or requiring a "two-shot process." It is desirable, therefore, to prepare poly(alkylene carbonate) polymers having primary hydroxyl end groups for use as precursors to polyurethanes. Among other things, the present disclosure provides methods for obtaining such poly(alkylene carbonate) polymers.

Methods and Systems for OH End Group Isomerization

The present disclosure overcomes the limitations of previous systems by providing methods for increasing the molar ratio of primary OH end groups in a poly(alkylene carbonate) polymer composition. In certain embodiments, such methods comprising subjecting the polymer composition to an isomerization step to increase the molar ratio of primary OH end groups in the polymer composition. In certain embodiments, such isomerization steps comprise heating a poly(alkylene carbonate) polymer, optionally in the presence of a copolymerization catalyst, to increase the molar ratio of primary OH end groups in the polymer composition. Without wishing to be bound by any particular theory, it is apparent that temperature, time, and catalyst residue are important parameters for promoting the isomerization of secondary OH end groups to primary OH groups.

In some embodiments, the present disclosure provides a method for increasing the ratio of primary to secondary OH

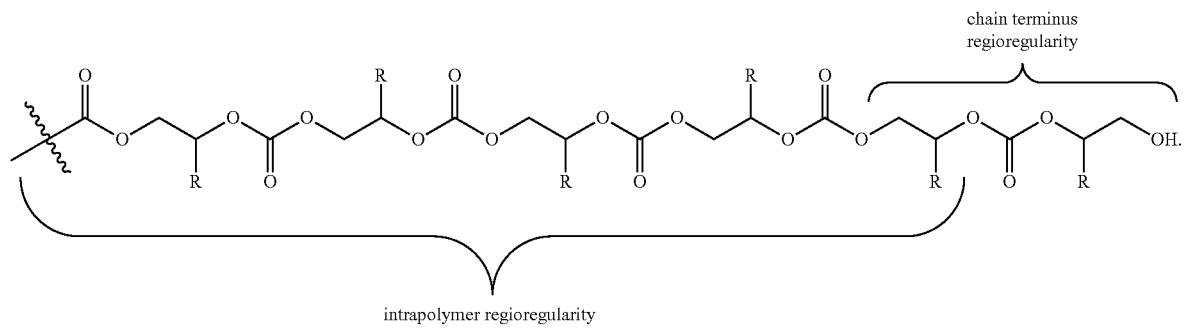

Poly(alkylene carbonate) polymers reported herein are useful in the preparation of polyurethanes. Such polyurethanes are prepared by the reaction of terminal hydroxyl groups of poly(alkylene carbonate) polymers with isocyanates. The polyurethane reaction is affected, however, by the regiochemistry of the hydroxyl end groups in that it proceeds more efficiently and quickly with primary hydroxyl end groups than with secondary or tertiary hydroxyl end groups of a poly(alkylene carbonate) polymer (e.g., poly(propylene carbonate) ("PPC") polymer) composition, the method comprising the step of isomerizing (e.g., isomerization promoted by heating) a starting poly(alkylene carbonate) polymer composition to provide a modified poly(alkylene carbonate) polymer composition wherein the modified poly(alkylene carbonate) polymer composition has a higher ratio of primary to secondary —OH end groups than the starting poly(alkylene carbonate) polymer composition. In particular, the present disclosure provides for a method of rearranging a secondary hydroxyl group on a starting poly (alkylene carbonate) polymer into a primary hydroxyl group, thereby providing a "modified" poly(alkylene carbonate) polymer composition. In some embodiments, a modified poly(alkylene carbonate) polymer composition comprises at least one polymer molecule wherein a secondary hydroxyl group has rearranged into a primary hydroxyl group. In some embodiments, such modified poly(alkylene carbonate) polymer compositions are characterized in that the intrapolymer regioregularity of the polymer chains comprising the composition remains unchanged.

In some embodiments, a starting poly(alkylene carbonate) polymer composition is substantially free of copolymerization catalyst. That is, in some embodiments, a copolymerization catalyst (i.e., a catalyst used to copolymerize alkylene oxide and carbon dioxide) has been removed from a starting poly(alkylene carbonate) polymer composition. In some embodiments, a starting poly(alkylene carbonate) polymer composition is substantially free of copolymerization catalyst and the isomerizing step comprises treating (e.g., heating) a starting poly(alkylene carbonate) polymer composition at a temperature of about 100° C. to about 180° C. In some embodiments, a starting poly(alkylene carbonate) polymer composition is substantially free of transition metals. In some embodiments, a starting poly(alkylene carbonate) polymer composition is substantially free of organic cations. In some embodiments, a starting poly(alkylene carbonate) polymer composition is substantially free of organic cations that are not covalently bonded to a copolymerization catalyst or ligand thereof.

Copolymerization Catalyst Presence

Further, the present disclosure encompasses the recognition that the temperature required to isomerize the secondary hydroxyl group on the poly(alkylene carbonate) polymer may be impacted by the presence of an active or inactive form of a copolymerization catalyst. Accordingly, in some embodiments, the methods reported herein further comprise the step of copolymerizing alkylene oxide and $CO_2$ in the presence of a copolymerization catalyst to form a reaction mixture comprising unquenched copolymerization catalyst and the starting poly(alkykene carbonate) polymer composition. In some embodiments, the reaction mixture is then heated to a higher temperature or maintained at the same temperature as the copolymerization reaction. In some embodiments, a reaction mixture comprising an unquenched copolymerization catalyst and starting poly(alkylene carbonate) polymer composition is heated to a temperature in the range of about 50° C. to about 100° C. In some embodiments, an unquenched copolymerization catalyst and starting poly(alkylene carbonate) polymer composition is heated to a temperature in the range of about 50° C. to about 90° C. In some embodiments, an unquenched copolymerization catalyst and starting poly(alkylene carbonate) polymer composition is heated to a temperature in the range of about 50° C. to about 85° C. In some embodiments, an unquenched polymerization catalyst and starting poly(alkylene carbonate) polymer composition is heated to a temperature in the range of about 50° C. to about 70° C. In some embodiments, an unquenched copolymerization catalyst and starting poly(alkylene carbonate) polymer composition is heated to a temperature of about 65° C.

Suitable copolymerization catalysts for the preparation of poly(alkylene carbonate) (e.g., poly(propylene) carbonate) are known in the art and may be used in the provided methods. By way of nonlimiting example, in some embodiments a copolymerization catalyst is selected from the group consisting of:

i) (salcy)MX (salcy=N,N'-bis(3,5-di-tertbutylsalicylidene)-1,2-diaminocyclohexane; M=Al, Co, Cr, Mn; X=halide, carboxylate, or carbonate);
ii) zinc glutarate;
iii) TPPM-X (TPP=tetraphenylphorphyrin; M=Al, Co, Cr; X=halide or alkoxide), (betadiiminate); and
iv) zinc acetate.

In some embodiments a copolymerization catalyst is a metallosalenate catalyst. In some embodiments, a copolymerization catalyst is a cobalt salen catalyst. In some embodiments, a copolymerization catalyst is a metal complex described in WO2010/022388, WO2010/013948, WO2010/147421, WO2012/037282, WO2013/022932, WO2013/012895, WO2013/096602, WO2014/031811, WO2016/012785, WO2016/012786, and WO2008/136591, the entire contents of each of which are hereby incorporated by reference.

In some embodiments, a quenching agent is added to the modified (polyalkylene carbonate) polymer composition after the isomerizing (e.g., heating) step. In some embodiments, the quenching agent is added to the reaction mixture after the ratio of primary to secondary OH end groups has increased to a desired level and/or by a desired amount as further defined herein below. In some embodiments, the quenching agent is suitable to end the copolymerization reaction. In some embodiments, the quenching agent is suitable to neutralize an unquenched copolymerization catalyst. In some embodiments, a quenching agent is one of those described in WO2010/033705, the entire content of which is hereby incorporated by reference.

In some embodiments, a quenching agent suitable to end the copolymerization reaction is added to the reaction mixture prior to the isomerizing (e.g., heating) step. In some embodiments, a quenching agent suitable to end the copolymerization reaction is added to a reaction mixture comprising an unquenched reaction and a starting poly(alkylene carbonate) polymer, thereby providing a reaction mixture comprising a quenched copolymerization catalyst and the starting poly(alkylene carbonate) polymer.

In some embodiments, a reaction mixture comprising a quenched copolymerization catalyst and a starting poly (alkylene carbonate) polymer is heated at lower temperatures to promote isomerization than a temperature used when no catalyst residue is present, but at higher temperatures than a temperature used when unquenched copolymerization catalyst is present. In some embodiments, the reaction mixture comprising a quenched copolymerization catalyst and a starting poly(alkylene carbonate) polymer is heated to a temperature in the range of about 50° C. to about 120° C. In some embodiments, a quenched copolymerization catalyst and starting poly(alkylene carbonate) polymer is heated to a temperature in the range of about 50° C. to about 100° C. In some embodiments, a quenched copolymerization catalyst and starting poly(alkylene carbonate) polymer is heated to a temperature in the range of about 60° C. to about 90° C. In some embodiments, a quenched copolymerization catalyst and starting poly(alkylene carbonate) polymer is heated to a temperature of about 90° C. In some embodiments, a quenched copolymerization catalyst and starting poly(alkylene carbonate) polymer is heated to a temperature of about 65° C.

After quenching the reaction mixture to deactivate the copolymerization catalyst, the reaction mixture may be filtered (e.g., through celite, silica gel, or the like) to separate the copolymerization catalyst from the poly(alkylene carbonate) polymer, thereby providing a poly(alkylene carbonate) polymer substantially free of a copolymerization catalyst. After quenching the reaction mixture to deactivate the copolymerization catalyst, the reaction mixture may be treated with a resin to separate the copolymerization catalyst from the poly(alkylene carbonate) polymer, thereby providing a poly(alkylene carbonate) polymer substantially free of a copolymerization catalyst. Suitable resins and filter aids are described in WO2010/033703 and WO2008/136591, the entire contents of each of which are hereby incorporated by reference.

A person of skill in the art would readily know what agents qualify as "quenching" agents within the context of alkylene oxide/$CO_2$ copolymerization. In some embodiments, a quenching agent can be used to neutralize a copolymerization catalyst. In some embodiments, a quenching agent is suitable to end the copolymerization reaction. For example, in some embodiments, the quenching agent is an acid. In some embodiments, the quenching agent is selected from hydrochloric acid, hydrofluoric acid, fluoroboric acid, and sulfuric acid, acetic acid, sulfonic acid, sulfamic acid, phosphoric acid, phosphinic acid, and boric acid. Examples of suitable quenching agents are found in PCT Application Publication No. WO 2010/033705, which is incorporated herein by reference.

Method Parameters and Conditions

In some embodiments, a starting poly(alkylene carbonate) polymer is heated for a certain length of time, to maximize primary hydroxyl groups and/or minimize cPC formation. For example, in some embodiments, a starting poly(alkylene carbonate) polymer is heated for about 1 hour. In some embodiments, a starting poly(alkylene carbonate) polymer is heated for at least 2 hours. In some embodiments, a starting poly(alkylene carbonate) polymer is heated for at least 4 hours. In some embodiments, a starting poly(alkylene carbonate) polymer is heated for at least 10 hours. In some embodiments, a starting poly(alkylene carbonate) polymer is heated for at least 15 hours. In some embodiments, a starting poly(alkylene carbonate) polymer is heated for at least 20 hours. In some embodiments, a starting poly(alkylene carbonate) polymer is heated for at least 25 hours. In some embodiments, a starting poly(alkylene carbonate) polymer is heated for at least 30 hours. In some embodiments, a starting poly(alkylene carbonate) polymer is heated for between about 1 hour and 15 hours. In some embodiments, a starting poly(alkylene carbonate) polymer is heated for between about 5 hours and 10 hours. In some embodiments, a starting poly(alkylene carbonate) polymer is heated for 1 hour, 2 hours, 3 hours, 4 hours, 5 hours, 6 hours, 7 hours, 8 hours, 9 hours, or 10 hours.

In some embodiments, a starting poly(alkylene carbonate) polymer is heated to a temperature of between about 60° C. to about 70° C. for about 5 hours to about 30 hours. In some embodiments, a starting poly(alkylene carbonate) polymer is heated to a temperature of about 65° C. for about 5 hours to about 10 hours. In some embodiments, a starting poly(alkylene carbonate) polymer is heated at a temperature of about 65° C. for about 5 hours, 6 hours, 7 hours, 8 hours, 9 hours, or 10 hours. In some embodiments, a starting poly(alkylene carbonate) polymer is heated to a temperature of about 65° C. for about 20 hours to about 30 hours. In some embodiments, a starting poly(alkylene carbonate) polymer is heated to a temperature of about 65° C. for about 22 hours to about 27 hours. In some embodiments, a starting poly(alkylene carbonate) polymer is heated to a temperature of about 65° C. for about 22 hours, 23 hours, 24 hours, 25, hours, 26 hours, or 27 hours.

In some embodiments, a starting poly(alkylene carbonate) polymer is heated to a temperature of between about 80° C. to about 100° C. for about 1 hour to about 15 hours. In some embodiments, a starting poly(alkylene carbonate) polymer is heated to a temperature of about 90° C. for about 1 hours to about 7 hours. In some embodiments, a starting poly(alkylene carbonate) polymer is heated to a temperature of about 90° C. for about 1 hour, 2 hours, 3 hours, 4 hours, 5 hours, 6 hours, or 7 hours.

In some embodiments, a starting poly(alkylene carbonate) polymer is heated to a temperature of between 100° C. and 140° C. for about 1 hour to about 30 hours. In some embodiments, a starting (polyalkylene carbonate) polymer is heated to a temperature of about 120° C. for about 1 hour to about 5 hours. In some embodiments, a starting (polyalkylene carbonate) polymer is heated to a temperature of about 120° C. for about 1 hour. In some embodiments, a starting (polyalkylene carbonate) polymer is heated to a temperature of about 120° C. for about 1 hour, 2 hours, 3 hours, 4 hours, or 5 hours. In some embodiments, a starting (polyalkylene carbonate) polymer is heated to a temperature of about 120° C. for about 20 hours to about 30 hours. In some embodiments, a starting (polyalkylene carbonate) polymer is heated to a temperature of about 120° C. for about 20 hours, 21 hours, 22 hours, 23 hours, 24 hours, 25 hours, 26 hours, 27 hours, 28 hours, 29 hours, or 30 hours.

In some embodiments of provided methods, $CO_2$ is vented from the reaction mixture prior to isomerizing (e.g., heating). In some embodiments, $CO_2$ is vented from the reaction mixture after isomerizing (e.g., heating).

In some embodiments, the isomerizing (e.g., heating) step can be performed in a continuous flow format. For example, as illustrated in FIG. 1, an apparatus 100 can be used comprising a feed reservoir 101, a heating element 102, a product reservoir 103, and a connector (e.g., a flow path) 104 connecting the feed reservoir and the product reservoir, configured to heat the a connector (e.g., a flow path) 104. A starting poly(alkylene carbonate) polymer can be placed in the feed reservoir 101 and pumped through the tube 104 which is being heated by the heating element 102 (i.e., is traveling through a heating zone) at a given rate and temperature before arriving in the product reservoir 103 as a modified poly(alkylene carbonate). In some embodiments, methods and systems of the present disclosure further provide drawing a starting poly(alkylene carbonate) composition from a feed reservoir, flowing the starting poly(alkylene carbonate) through a heated zone and accumulating a modified poly(alkylene carbonate) composition in a product reservoir.

The methods and compositions reported herein are not limited to batch size. For example, in some embodiments, the starting and/or modified poly(alkylene carbonate) polymer composition comprises at least 100 mg, at least 1 g, or at least 1 kg of poly(alkylene carbonate). In some embodiments, the starting and/or modified poly(alkylene carbonate) polymer composition comprises more than 4 kg, more than 20 kg, greater more 200 kg, more than 1 metric ton, more than 20 metric tons, or more than 130 metric tons of starting poly(alkylene carbonate) polymer. In some embodiments, the starting and/or modified poly(alkylene carbonate) polymer composition is a bulk sample. In some embodiments, the starting and/or modified poly(alkylene carbonate) polymer composition is not an analytical sample.

In certain embodiments, starting and/or modified poly(alkylene carbonate) polymer compositions used in provided methods comprise an embedded chain transfer agent. Exemplary but non-limiting examples of chain transfer agents are reported in PCT Applications Publication No. WO 2010/028362 and WO 2010/062703, the entire content of each of which are incorporated herein by reference. In some embodiments, the chain transfer agent is a multivalent chain transfer agent. In some embodiments, a chain transfer agent is a divalent (i.e., contains two functional groups capable of initiating polymer chain growth) chain transfer agent. In some embodiments, the chain transfer agent is a trivalent chain transfer agent. In some embodiments, the chain transfer agent is a tetravalent chain transfer agent. In some embodiments, the chain transfer agent is a polyhydric alcohol. In some embodiments, the polyhydric alcohol is selected from a diol, a triol, a tetraol and a higher polyol or an alkoxylated analog of any of these. In some embodiments, a chain transfer agent is selected from the group consisting of dipropylene glycol, polypropylene glycol, diethylene glycol, or polyethylene glycol.

Isomerization Catalysts

Additionally or alternatively, in some embodiments, the present disclosure provides a method for increasing the ratio of primary to secondary OH end groups of a poly(alkylene carbonate) (e.g., a poly(propylene carbonate)) polymer composition, the method comprising the step of contacting a starting poly(alkylene carbonate) polymer composition with an isomerization catalyst to provide a modified poly(alkylene carbonate) polymer composition wherein the modified poly(alkylene carbonate) polymer composition has a higher ratio of primary to secondary OH end groups than the starting poly(alkylene carbonate) polymer composition.

As referred to herein, an "isomerization catalyst" refers to a catalyst that promotes the isomerization of a secondary hydroxyl group into a primary hydroxyl group. An isomerization catalyst, as used herein, is distinct from a catalyst that installs an additional moiety onto the terminal ends of a poly(alkylene carbonate) polyol to thereby yield a primary hydroxyl group. For example, catalysts that install additional moieties onto the terminal ends of poly(alkylene carbonate) polyols are reported in U.S. Patent Application Publication No. 2013/0296450. In some embodiments, an isomerization catalyst is other than a double-metal cyanide catalyst.

In some embodiments, an isomerization catalyst is a Lewis or Brönsted Acid, or a Lewis or Brönsted Base. In some embodiments, an isomerization catalyst is a Lewis or Brönsted Acid. In some embodiments, an isomerization catalyst is a Lewis Acid. In some embodiments, an isomerization catalyst is a Brönsted Acid. In some embodiments, an isomerization catalyst is a transition metal Lewis Acid, a main group Lewis acid, an alkali Lewis acid, or an alkaline Lewis Acid. In some embodiments, an isomerization catalyst is a hydrogen halide, a hydrogen phosphate, an aluminum oxide, a boronic acid, a boronic ester, an alkyl borane, an aryl borane, an ammonium acid, a sulfonic acid, or a zeolite.

In some embodiments, an isomerization catalyst is an esterification catalyst. In some embodiments, an isomerization catalyst is an esterification catalyst selected from the group consisting of:

Esterification and acylation catalysts such as those reported in Grasa, G. A.: et al. *Synthesis* 2004, 7, 971. and Otera, *J. Chem. Rev.* 1993, 93, 1449;

Aromatic and alkyl amines, for example: Pyridine, lutidine, 4-dimethylaminopyridine, tetramethylethylenedaimine, triethylamine, di sopropylethylamine, DBU, TBD, MTBD, DABCO, guanidines;

Phosphines and phosphazenes, for example: tributylphosphine, triphenylphosphine, and Bis(triphenylphosphine) iminium chloride (PPNCl);

Metal salts. For example, halide, triflate or perchlorate salts derived from: trimethylsilyl, lithium, magnesium, indium, tin, bismuth, titanium, copper, scandium, nickel, cobalt, ruthenium, silver, lanthium, and zinc;

Other nitrogen-containing heterocycles. For example, imidazoles, such as 1-methylimidazole, 1-phenethylimidazole, 1-isopropylimidazole, imidazole and the like;

Bronsted Acids, for example: HCl, $H_2SO_4$, methanesulfonic acid, toluenesulfonic acid, and $H_3PO_4$;

Lewis acids, for example: bismuth 2-ethylhexanoate, tin (2-ethylhexanoate), tin(II)sterate, tin(II)acetate, dibutyltin dilaurate, molybdenum dichloro dioxide, iron trichloride, zinc oxide, tin oxide, silica chloride;

Organometallic catalysts known to form polycarbonates from epoxides and carbon dioxide, for example: (salcy)MX (salcy=N,N'-bis(3,5-di-tert-butylsalicylidene)-1,2-diaminocyclohexane; M=Al, Co, Cr, Mn; X=halide or carboxylate), zinc glutarate, TPPM-X (TPP=tetraphenylphorphyrin; M=Al, Co, Cr; X=halide or alkoxide), (beta-diiminate)zinc acetate;

Solid acids or bases and ion exchange resins, for example: Amberlyst-15, poly(4-vinylpyridine), montmorillite K-10, montmorillite KSF, zeolite, alumina, silica, solid supported sulfonic acids, Naffion-H, $HBF_4$ on $SiO_2$, $HClO_4$ on $SiO_2$.

In some embodiments, an isomerization catalyst is a Lewis Acid catalyst. In some embodiments, a Lewis Acid Catalyst is a metal based Lewis Acid Catalyst having the general formula $M(R^1)_1(R^2)_1(R^3)_1(R^4)_{0-1}$, wherein M is boron, aluminum, indium, bismuth or erbium, $R^1$ and $R^2$ each independently includes a fluoro-substituted phenyl or methyl group, $R^3$ includes a fluoro-substituted phenyl or methyl group or a functional group or functional polymer group, optional $R^4$ is a functional group or functional polymer group. By fluoro-substituted phenyl group it is meant a phenyl group that includes at least one hydrogen atom replaced with a fluorine atom. By fluoro-substituted methyl group it is meant a methyl group that includes at least one hydrogen atom replaced with a fluorine atom. $R^1$, $R^2$, and $R^3$ may include the fluoro-substituted phenyl group or may consist essentially of the fluoro-substituted phenyl group. $R^1$, $R^2$, and $R^3$ may include the fluoro-substituted methyl group, e.g., in the form of a fluoro-substituted methyl group bonded with a sulfuroxide (e.g., sulfurtrioxide). The M in the general formula may exist as a metal salt ion or as an integrally bonded part of the formula.

The functional group or functional polymer group may be a Lewis base that forms a complex with the Lewis acid catalyst (e.g., a boron based Lewis acid catalyst or a metal triflate catalyst). By functional group or functional polymer group it is meant a molecule that contains at least one of the following: an alcohol, an alkylaryl, a linear or branched alkyl having 1-12 carbon atoms, a cycloalkyl, a propyl, a propyl oxide, a mercaptan, an organosilane, an organosiloxane, an oxime, an alkylene group capable of functioning as a covalent bridge to another boron atom, a divalent organosiloxane group capable of functioning as a covalent bridge to another boron atom, and substituted analogs thereof. However, other known functional polymer groups combinable with a Lewis Acid catalyst such as a boron based Lewis acid catalyst or metal triflate may be used.

In some embodiments, an isomerization catalyst is a Lewis Acid catalyst that is a boron based Lewis Acid catalyst that has the general formula $B(R^1)_1(R^2)_1(R^3)_1(R^4)_{0-1}$, where $R^1$ and $R^2$ are each independently the fluoro-substituted phenyl group, $R^3$ is the fluoro-substituted phenyl group or the functional group or functional polymer group, optionally $R^4$ is the functional group or functional polymer group. In some embodiments, an isomerization catalyst is a boron based Lewis acid. In some embodiments, an isomerization catalyst is selected from the group consisting of: boric acid, a boronic ester, an alkyl borane, and an aryl borane. In some embodiments, an isomerization catalyst is boric acid.

In some embodiments, a boron based Lewis Acid catalyst is tris(pentafluorophenyl)borane:

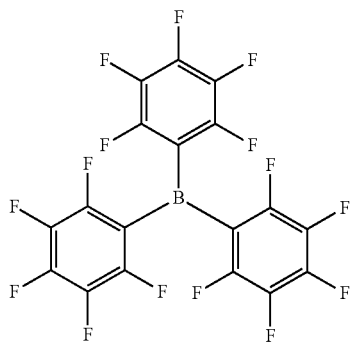 [SMILES: Fc1c(F)c(F)c(B(c2c(F)c(F)c(F)c(F)c2F)c2c(F)c(F)c(F)c(F)c2F)c(F)c1F]

In some embodiments, a boron based Lewis Acid catalyst is:

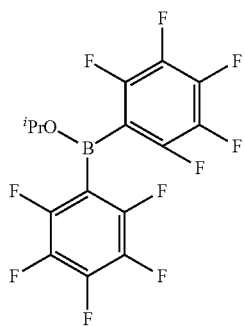 [SMILES: CC(C)OB(c1c(F)c(F)c(F)c(F)c1F)c1c(F)c(F)c(F)c(F)c1F]

In some embodiments, an isomerization catalyst is a Lewis Acid catalyst that is a metal triflate. For example, the metal triflate has the general formula $M(R^1)_1(R^2)_1(R^3)_1(R^4)_{0-1}$, where M is aluminum, indium, bismuth or erbium, and $R^1$, $R^2$, and $R^3$ are each $CF_3SO_3$.

In some embodiments, an isomerization catalyst is a Lewis Acid catalyst composition comprising one or more Lewis Acid catalysts (e.g., each having the general formula $B(R^1)_1(R^2)_1(R^3)_1(R^4)_{0-1}$, wherein $R^1$ and $R^2$ are each independently a fluoro-substituted phenyl or methyl group, $R^3$ is a fluoro-substituted phenyl or methyl group or a functional group or functional polymer group, optional $R^4$ is the functional group or functional polymer group). In some embodiments, the isomerization catalyst is a Lewis Acid catalyst that is a combination of a Lewis Acid and another catalyst, wherein the Lewis Acid catalysts comprises at least 75 wt % of the total weight of the combination catalyst. The added blend catalyst may exclude any DMC based catalysts. Exemplary metal-based Lewis acids are based on one of aluminum, boron, copper, iron, silicon, tin, titanium, zinc, and zirconium.

In some embodiments, an isomerization catalyst is selected from zinc chloride, zinc bromide, zinc fluoride, zinc triflate, zinc oxide, aluminum chloride, aluminum bromide, aluminum fluoride, aluminum triflate, tin chloride, tin oxide, dibutyltin dilaurate, molybdenum dichloro dioxide, iron (II) chloride, iron (III) chloride, silica chloride, magnesium chloride, manganese chloride, cobalt (II) chloride, titanium chloride, copper bromide, copper triflate, lithium chloride, hydrogen chloride, hydrogen bromide, hydrogen iodide, hydrogen fluoride, boric acid, triphenylborane, trifluoroborane, tris(pentafluorophenyl)borane, fluoroantimonic acid, perchloric acid, trifluoromethanesulfonic acid, triflic anhydride, antimony pentafluoride, tetrabutylammonium bromide, tetrabutylphosphonium bromide, cesium triflate, chromium acetate, acetic acid, sulfuric acid, p-toluene sulfonic acid, methane sulfonic acid, ethane sulfonic acid, 1-propane sulfonic acid, trifluoromethyl sulfonic acid, 4-nitrophenyl sulfonic acid, sulfoacetic acid, cumenesulphonic acid, vylene sulfonic acid, 3-amino-1-1-propanesulfonic acid, 2-(methylamino)ethanesulfonic acid, 2-aminoethanesulfonic acid, 2-sulfanylethanesulfonic acid, 3-hydroxy-1-propanesulfonic acid, benzenesulfonic acid, 3-pyridinesulfonic acid, 2-pyridinesulfonic acid, 4-piperidinesulfonic acid, 2-aminobenzenesulfonic acid, 1-methylpyridinium 3-sulfonate, 1-methyl-2-pyridiniumsulfonate, 4-hydroxybenzenesulfonic acid, cyclohexane sulfonic acid, 4-ethylbenzenesulfonic acid, 2,5-dimethylbenzenesulfonic acid, 4-methylmetanilic acid, 4-amino-3-methylbenzenesulfonic acid, 1-Naphthalenesulfonic acid, 2-amino-5-methylbenzenesulfonic acid, perfluorooctane sulfonic acid, sulfamic acid, phosphoric acid, pyrophosphoric acid, triphosphoric acid, an alkyl derivative of phosphoric acid, pyrophosphoric acid, triphosphoric acid, an aryl derivative of phosphoric acid, pyrophosphoric acid, zinc glutarate, (beta-diiminate) zinc acetate, perfluorosulfonic acid polymer, or any combination thereof.

In some embodiments, an isomerization catalyst is a Lewis or Brönsted Base. In some embodiments, an isomerization catalyst is a Lewis Base. In some embodiments, an isomerization catalyst is a Brönsted Base. In some embodiments, an isomerization catalyst is an alkali carboxylate, an alkaline carboxylate, an alkyl amine, an aromatic amine, a phosphine, a phosphazene, an alkyl thiolate, an aryl thiolate, an alkali phosphate, an alkaline phosphate, a transition metal hydroxide, a transition metal oxide, an alkaline carbonate, an alkaline bicarbonate, an alkali carbonate, an alkali bicarbonate, or a phosphine oxide.

In some embodiments, an isomerization catalyst is lithium acetate, calcium stearate, ammonia, 1,8-diazabicyclo[5.4.0]undec-7-ene (DBU), 1,5,7-triazabicylo[4.4.0]dec-5-ene (TBD), 7-methyl-1,5,7-triazabicyclo[4.4.0]dec-5-ene (MTBD), 1,4-diazabicyclo[2.2.2]octane (DABCO), trimethylamine, lutidine, 4-dimethylaminopyridine, tetramethylethylenediamine, diisopropylamine, imidazole, 1-methylimidazole, 1-phenethylimidazole, 1-isopropylimidazole, pyridine, tributylphosphine, triphenylphosphine, triphenylphosphine oxide, bis(triphenylphosphine) iminium chloride, potassium thiophenolate, sodium thiophenolate, trisodium phosphate, tricalcium phosphate, aluminum hydroxide, tin oxide, calcium carbonate, lithium carbonate, potassium hydroxide, sodium hydroxide, diethyl zinc, trimethyl aluminum, dimethyl copper, potassium phosphate, potassium carbonate, sodium bicarbonate, $MoOCl_2$, or any combination thereof. In some embodiments, an isomerization catalyst is calcium stearate.

In some embodiments, an isomerization catalyst comprises or is bound to a solid support. In some embodiments, a solid support is an inorganic solid support or a polymeric solid support. In some embodiments, an inorganic solid support is selected from silica, alumina, zirconia, titania, zeolites, metal oxides, and clays. In some embodiments, a polymeric solid support is styrene, chloromethylated styrene and divynylbenzene, polystyrenes, polysulfones, nylons, poly(chloromethyl styrene), polyolefins, polymethylmethacrylate, cross-linked ethoxylate acrylate resin polymers, or combinations of any of these. Accordingly, in some embodiments, an isomerization catalyst is Amberlyst-15, poly(4-vinylpyridine), montmorillite K-10, montmorillite KSF, zeolite, alumina, silica, a solid supported sulfonic acid, Naffion-H, $HBF_4$ on $SiO_2$, or $HClO_4$ on $SiO_2$.

In some embodiments, a starting poly(alkylene carbonate) polymer composition is contacted with two or more isomerization catalysts. In some embodiments, a starting PPC polymer composition is contacted with two isomerization catalysts. In some embodiments, a starting poly(alkylene carbonate) polymer composition is contacted with boric acid and calcium stearate.

In some embodiments, a starting poly (alkylene carbonate) polymer is contacted with an isomerization catalyst for between about 1 minute to about 120 hours. In some embodiments, a starting poly (alkylene carbonate) polymer is contacted with an isomerization catalyst for between about 1 minute to about 10 minutes. In some embodiments, a starting poly (alkylene carbonate) polymer is contacted with an isomerization catalyst for between about 5 minutes to about 15 minutes. In some embodiments, a starting poly (alkylene carbonate) polymer is contacted with an isomerization catalyst for between about 15 minutes to about 30 minutes. In some embodiments, a starting poly (alkylene carbonate) polymer is contacted with an isomerization catalyst for between about 15 minutes to about 60 minutes. In some embodiments, a starting poly (alkylene carbonate) polymer is contacted with an isomerization catalyst for between about 1 hour to about 12 hours. In some embodiments, a starting poly (alkylene carbonate) polymer is contacted with an isomerization catalyst for between about 1 hour to about 4 hours. In some embodiments, a starting poly (alkylene carbonate) polymer is contacted with an isomerization catalyst for between about 4 hours to about 16 hours. In some embodiments, a starting poly (alkylene carbonate) polymer is contacted with an isomerization catalyst for between about 12 hours to about 24 hours. In some embodiments, a starting poly (alkylene carbonate) polymer is contacted with an isomerization catalyst for between about 24 hours to about 48 hours. In some embodiments, a starting poly (alkylene carbonate) polymer is contacted with an isomerization catalyst for between about 48 hours to about 72 hours. In some embodiments, a starting poly (alkylene carbonate) polymer is contacted with an isomerization catalyst for between about 72 hours to about 120 hours.

In some embodiments, methods reported herein further comprise heating a starting poly(alkylene carbonate) (e.g., poly(propylene carbonate)) polymer and isomerization catalyst. In some embodiments, a heating step comprises heating a starting poly(alkylene carbonate) polymer composition and isomerization catalyst at a temperature in the range of about 50° C. to about 140° C. In some embodiments, a heating step comprises heating a starting poly(alkylene carbonate) polymer composition and isomerization catalyst at a temperature in the range of about 80° C. to about 130° C. In some embodiments, a heating step comprises heating a starting poly(alkylene carbonate) polymer composition and isomerization catalyst at a temperature in the range of about 90° C. to about 120° C. In some embodiments, a heating step comprises heating a starting poly(alkylene carbonate) polymer composition and isomerization catalyst at a temperature in the range of about 90° C. to about 100° C. In some embodiments, a heating step comprises heating a starting poly(alkylene carbonate) polymer composition and isomerization catalyst at a temperature of about 90° C. In some embodiments, a heating step comprises heating a starting poly(alkylene carbonate) polymer composition and isomerization catalyst at a temperature of about 120° C.

In some embodiments, an isomerization catalyst is calcium stearate, and a starting poly(alkylene carbonate) polymer and calcium stearate are heated to a temperature of about 90° C.

In some embodiments, an isomerization catalyst is boric acid, and a starting poly(alkylene carbonate) polymer and boric acid are heated to a temperature of about 120° C.

In some embodiments, a starting poly(alkylene carbonate) polymer composition is substantially free of a copolymerization catalyst.

In some embodiments, a mass ratio of isomerization catalyst to starting poly(alkylene carbonate) polymer composition is less than 1:10, less than 1:20, less than 1:50, less than 1:100, less than 1:200, less than 1:500, less than 1:1000, or less than 1:5000.

Modified Composition Characteristics Obtained by Provided Methods

As noted, the methods provided herein provide means for increasing the ratio of primary hydroxyl end groups relative to secondary hydroxyl end groups in a poly(alkylene carbonate) polymer composition to a desired threshold. For example, in some embodiments, the molar percent of primary OH end groups in a modified poly(alkylene carbonate) polymer composition (relative to all poly(alkylene carbonate) —OH end groups) is increased to at least 15% greater than the molar percent of primary OH end groups in the starting poly(alkylene carbonate) polymer. For example, a starting poly(alkylene carbonate) polymer composition having 10% primary OH end groups that is modified to become a modified poly(alkylene carbonate) polymer having 25% end groups, it is understood that the modified poly(alkylene carbonate) polymer composition is increased to 15% (i.e., 25%-10%=15%) greater than the molar percent of primary OH end groups in the starting poly(alkylene carbonate) polymer. Accordingly, in some embodiments, a molar percent of primary OH end groups in a modified poly(alkylene carbonate) polymer is at least 15%, at least 20%, at least 25%, at least 30%, at least 35%, at least 40%, at least 45%, at least 50%, or at least 51% greater than the molar percent of primary OH end groups in the starting poly(alkylene carbonate) polymer. In certain embodiments, the molar percent of primary OH end groups in a modified poly(alkylene carbonate) polymer composition is increased to 15-25%, 20-30%, 25-35%, 30-40%, 35-45%, 40-50%, 45-55%, 50-60%, 55-65%, 60-70%, 65-75%, 70-80%, 75-85%, 80-90%, 85-95%, 90-99%, or greater than 99%.

In some embodiments, the molar percent of primary OH end groups in a modified poly(alkylene carbonate) polymer is greater than about 5%, greater than about 7%, greater than about 10%, or greater than about 15%. In some embodiments, the molar percent of primary OH end groups is greater than about 10%, greater than about 15%, greater than about 20%, greater than about 25%, greater than about 30%, greater than about 35%, greater than about 40%, greater than about 45%, or greater than about 50%. In some embodiments, the molar percent of primary OH end groups is about 35%. In some embodiments, the molar percent of primary OH end groups in a modified poly(alkylene carbonate)

polymer is 45-55%. In some embodiments, the molar percent of primary OH end groups in a modified poly(alkylene carbonate) polymer is greater than about 50%, greater than about 55%, greater than about 60%, greater than about 65%, greater than about 70%, greater than about 75%, greater than about 80%, greater than about 85%, greater than about 90%, or greater than about 95%. In certain embodiments, the molar percent of primary OH end groups in a modified poly(alkylene carbonate) polymer is 15-25%, 20-30%, 25-35%, 30-40%, 35-45%, 40-50%, 45-55%, 50-60%, 55-65%, 60-70%, 65-75%, 70-80%, 75-85%, 80-90%, 85-95%, 90-99%, or greater than 99%.

In some embodiments, the molar percent of primary OH end groups in a modified poly(alkylene carbonate) polymer composition is about 35% greater than a molar percent of primary OH end groups in the starting poly(alkylene carbonate) polymer. In some embodiments, the molar percent of primary OH end groups in a modified poly(alkylene carbonate) polymer composition is at least 45% greater than the molar percent of primary OH end groups in a starting poly(alkylene carbonate) polymer. In some embodiments, the molar percent of primary OH end groups in a modified poly(alkylene carbonate) polymer composition is at least 50%, at least 55%, at least 60%, at least 65%, at least 70%, at least 75%, at least 80%, at least 85%, at least 90%, or at least 95% greater than the molar percent of primary OH end groups in a starting poly(alkylene carbonate) polymer. In some embodiments, the molar percent of primary OH end groups in a starting poly(alkylene carbonate) polymer composition is less than 15%, less than 10%, less than 8%, less than 5%, or less than 3%, or less than 2%.

In some embodiments, the ratio of primary OH end groups to secondary OH end groups in a modified the poly(alkylene carbonate) polymer composition is at least 50% greater than the ratio in a starting poly(alkylene carbonate) polymer composition. In some embodiments, the cyclic alkylene carbonate (e.g., cPC) may form as a byproduct. In certain embodiments, the present invention encompasses the recognition that appropriate conditions may be selected such that the percentage of primary OH end groups is increased while the formation of cyclic alkylene carbonate is minimized.

In some embodiments, an amount of cyclic alkylene carbonate (e.g., cPC) formed during a isomerizing (e.g., isomerization promoted by heating) step of a provided method is less than about 10 weight percent, about 9 weight percent, about 8 weight percent, about 7 weight percent, about 6 weight percent, about 5 weight percent, about 4 weight percent, about 3 weight percent, about 2 weight percent, or about 1 weight percent relative to the starting poly(alkylene carbonate) polymer. In some embodiments, the methods reported herein generate no more than about 1 to about 6 molar percent cyclic alkylene carbonate.

Modified Poly(Alkylene Carbonate) Polymers

Modified poly(alkylene carbonate) polymers provided herein exhibit an increased ratio of primary hydroxyl end groups to secondary hydroxyl end groups as compared to poly(alkylene carbonate) polymers prepared by traditional methods. Throughout this section, unless otherwise specified, references to poly(alkylene carbonate) polymers, or subgenera and subspecies thereof, are in reference to "modified poly(alkylene carbonate) polymers" as described above in relation to methods of the present disclosure.

In some embodiments, poly(alkylene carbonate) polymer compositions reported herein comprise poly(alkylene carbonate) polymer chains comprising a plurality of carbonate units derived from alkylene oxide and carbon dioxide. Such poly(alkylene carbonate) polymers comprise two categories of carbonate units: those occurring within the polymer chains (e.g. intrapolymer carbonate units), and those located at the polymer chain ends (e.g. chain terminus) as depicted below:

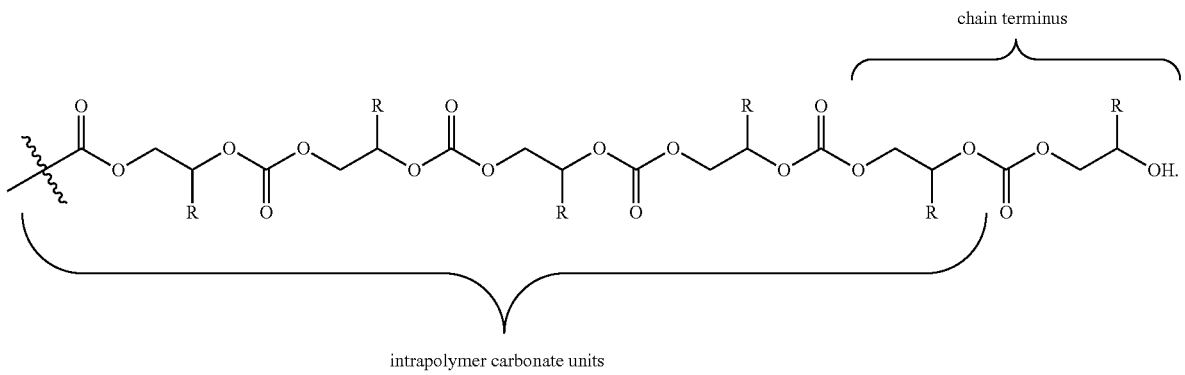

ratio of primary OH end groups to secondary OH end groups in a modified the poly(alkylene carbonate) polymer composition is at least 75%, at least 100%, at least 150%, at least 200%, at least 300%, at least 400%, or at least 500% greater than the ratio in a starting poly(alkylene carbonate) polymer composition. In some embodiments, the ratio of primary OH end groups to secondary OH end groups in a modified the poly(alkylene carbonate) polymer composition is 75-200%, 150-250%, 200-300%, 250-350%, 300-400%, 350-450%, 400-500%, or 500-1000% greater than the ratio in a starting poly(alkylene carbonate) polymer composition.

It is possible that during isomerizing (e.g., isomerization promoted by heating) a poly(alkylene carbonate) molecule, The chain terminus is distinguished by its position at the chain ends, and by the fact that a chain terminus bears a free hydroxyl end group. In certain embodiments, polymer compositions of the present invention are characterized in that there is a disjuncture between the regioregularity of the intrapolymer carbonate units and the regiochemistry of the chain terminus. In certain embodiments, the polymers are characterized in that the percentage of secondary hydroxyl end groups relative to primary hydroxyl end groups in a chain terminus is different than would be expected from the regioregularity of the intrapolymer carbonate units. In some embodiments, the percentage of secondary hydroxyl end groups relative to primary hydroxyl groups in the chain terminus is lower than expected based on the regioregularity of the intrapolymer carbonate units.

In some embodiments, poly(alkylene carbonate) polymer compositions reported herein comprise a plurality of carbonate units derived from alkylene oxide (e.g., propylene oxide) and carbon dioxide, characterized in that the intrapolymer units are arranged with a degree of regioregularity X, (representing the percentage of intrapolymer head-to-tail enchainment relative to all intrapolymer carbonate linkages in the chain) but the percentage of secondary hydroxyl end groups is less than the percentage that is expected from the intrapolymer regioregularity. Typically, where the chain terminus of such polymers is formed by the same process as the intrapolymer carbonate linkages, one expects the percentage of secondary —OH end groups to be 100−[100−X]/2. For example, a polyalkylene carbonate composition having 80% regioregularity for enchainment of the intrapolymer carbonate monomers is expected to have 90% secondary —OH end groups. In certain embodiments, the primary hydroxyl end group, is derived from one of the alkylene oxide monomers used in the poly(alkylene carbonate) copolymerization, and does not require additional moieties (i.e., a "cap") to be added to the polymer chain-ends in order to prepare a primary hydroxyl end group.

Accordingly, in some embodiments, a poly(alkylene carbonate) polymer has a regioregularity of X, wherein X represents the percentage of intrapolymer monomer units enchained in a head-to-tail orientation and has a value between 50% and 100%. In some embodiments, X is about 65%, about 70%, about 75%, about 80%, about 85%, about 90%, about 95%, about 96%, about 97%, about 98%, about 99%, or about 100%. In some embodiments, X is between about 95% and about 100%. In some embodiments, X is between about 97% and about 100%. In some embodiments, X is between about 98% and about 100%. In some embodiments, X is between about 99% and about 100%.

In some embodiments, a poly(alkylene carbonate) polymer composition comprises head-to-tail enchainment of carbonate monomers in the polymer chain that is about 70-90% or about 75-85%. In some embodiments, a poly(alkylene carbonate) polymer composition comprises head-to-tail enchainment of carbonate monomers in the polymer chain that is about 90-99.9% or about 93-98%.

In some embodiments, in a poly(alkylene carbonate) polymer, intrapolymer carbonate monomers arranged in a head-to-tail enchainment are represented by:

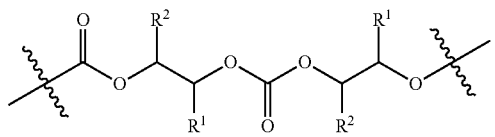

wherein each $R^1$ and $R^2$ are, in each instance, independently selected from H or an optionally substituted group selected from the group consisting of $C_1$-$C_{32}$ alkyl, $C_6$-$C_{18}$ aryl, $C_3$-$C_{18}$ cycloalkyl, 3 to 18 atom heterocycloalkyl, and 5 to 18 atom heteroaryl; bonds crossed by a ⌇ symbol represent a point of attachment to adjacent carbonate units; and polymerization proceeds in the direction of left to right. In some embodiments, $R^1$ is $C_1$-$C_{28}$ alkyl. In some embodiments, $R^1$ is $C_1$-$C_{20}$ alkyl. In some embodiments, $R^1$ is $C_1$-$C_{16}$ alkyl. In some embodiments, $R^1$ is $C_1$-$C_{12}$ alkyl. In some embodiments, $R^1$ is $C_1$-$C_{10}$ alkyl. In some embodiments, $R^1$ is $C_1$-$C_8$ alkyl. In some embodiments, $R^1$ is $C_1$-$C_6$ alkyl. In some embodiments, $R^1$ is $C_6$ alkyl. In some embodiments, $R^1$ is $C_5$ alkyl. In some embodiments, $R^1$ is $C_4$ alkyl. In some embodiments, $R^1$ is $C_3$ alkyl. In some embodiments, $R^1$ is $C_2$ alkyl. In some embodiments, $R^1$ is $C_1$ alkyl. In some embodiments, each $R^1$ is methyl. In some embodiments, each $R^2$ is H. In some embodiments, in a poly(propylene carbonate) polymer, intrapolymer carbonate units enchained with head-to-tail regiochemistry are represented by:

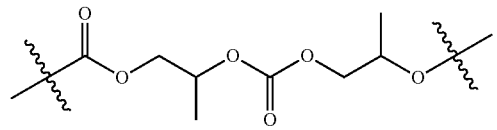 [SMILES: *OC(C)COC(=O)OC(C)COC(*)=O]

wherein bonds crossed by a ⌇ symbol represent a point of attachment to adjacent carbonate units.

In some embodiments, a chain terminus comprising a hydroxyl end group derived from carbon dioxide and alkylene oxide is represented by:

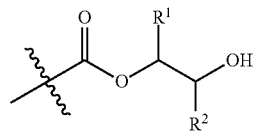

wherein $R^1$ and $R^2$ are, in each instance, each independently selected from H or $C_1$-$C_{32}$ alkyl, $C_{1-32}$ alkyl, $C_{1-32}$ alkenyl, $C_{1-32}$ alkyl-$R^a$, $C_{1-32}$ alkenyl-$R^a$, $C_6$-$C_{18}$ aryl, 5 to 18 atom heteroaryl, $C_3$-$C_{18}$ cycloalkyl, or 3 to 18 atom heterocycloalkyl; and $R^a$ is halogen, hydroxyl, —$OC_{1-32}$ alkyl, —OC(O)$C_{1-32}$ alkyl, —C(O)O$C_{1-32}$ alkyl, —$OC_{1-32}$ alkenyl, —OC(O)$C_{1-32}$ alkenyl, or —C(O)O$C_{1-32}$ alkenyl; and a bond crossed by a ⌇ symbol represents a point of attachment to the adjacent carbonate unit. In some embodiments, $R^1$ is $C_1$-$C_{28}$ alkyl. In some embodiments, $R^1$ is $C_1$-$C_{20}$ alkyl. In some embodiments, $R^1$ is $C_1$-$C_{16}$ alkyl. In some embodiments, $R^1$ is $C_1$-$C_{12}$ alkyl. In some embodiments, $R^1$ is $C_1$-$C_{10}$ alkyl. In some embodiments, $R^1$ is $C_1$-$C_8$ alkyl. In some embodiments, $R^1$ is $C_1$-$C_6$ alkyl. In some embodiments, $R^1$ is $C_6$ alkyl. In some embodiments, $R^1$ is $C_5$ alkyl. In some embodiments, $R^1$ is $C_4$ alkyl. In some embodiments, $R^1$ is $C_3$ alkyl. In some embodiments, $R^1$ is $C_2$ alkyl. In some embodiments, $R^1$ is $C_1$ alkyl. In some embodiments, $R^1$ is methyl. In some embodiments, $R^2$ is H. In some embodiments of PPC polymers provided herein, a chain terminus having a primary OH end group is represented by:

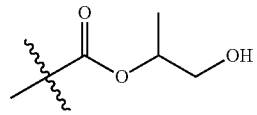 [SMILES: *C(=O)OC(C)CO]

wherein a bond crossed by the ⌇ symbol presents a point of attachment to an adjacent carbonate unit. In some embodiments of PPC polymers provided herein, a chain terminus having a secondary OH end group is represented by:

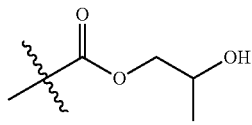 [SMILES: *C(=O)OCC(C)O]

wherein a bond crossed by a ⌇ symbol represents a point of attachment to an adjacent carbonate unit.

Regioregularity can be expressed as the percentage of monomers that exhibit the same regiochemistry. For example, in a poly(alkylene carbonate) polymer wherein every monomer is oriented in head-to-tail orientation, such a polymer would be 100% regioregular. Additionally, for example, if a poly(propylene carbonate) polymer comprises ten carbonate units, and contains one non-regioselective insertion of propylene oxide, the resulting poly(propylene carbonate) polymer chain would have two non head-to-tail linkages and would exhibit a regioregularity of 80% (i.e., 80% of the polymer linkages have a head-to-tail orientation of carbonate monomers). For example, in a poly(propylene carbonate) polymer wherein epoxide insertion generally occurs in a head-to-tail (H/T) enchainment, a mis-insertion (e.g., insertion oriented as head-to-head) would result in a head-to-head (H/H) linkage and a tail-to-tail (T/T) linkage, as illustrated below:

(alkylene carbonate) polymer chain comprises at least two chain termini bearing primary OH groups.

In some embodiments, the molar percent of chain termini bearing primary OH groups relative to all chain termini in a poly(alkylene carbonate) polymer composition is greater than about 5%, greater than about 7%, greater than about 10%, or greater than about 15%. In some embodiments, the molar percent of chain termini bearing primary OH groups in a poly(alkylene carbonate) polymer composition is greater than about 10%, greater than about 15%, greater than about 20%, greater than about 25%, greater than about 30%, greater than about 35%, greater than about 40%, greater than about 45%, or greater than about 50%.

In some embodiments, the molar percent of chain termini bearing primary OH groups relative to all chain termini in a poly(alkylene carbonate) polymer composition is about 35%. In some embodiments, the molar percent of chain termini having primary OH end groups in a poly(alkylene carbonate) polymer composition is about 45% to about 55%. In some embodiments, the molar percent of chain termini bearing primary OH end groups in a poly(alkylene carbonate) polymer composition is greater than about 70%, greater than about 75%, greater than about 80%, greater than about 85%, greater than about 90%, or greater than about 95%.

In some embodiments, the majority of primary OH end groups of a poly(alkylene carbonate) polymer composition are located on an alkylene unit (e.g., a propylene unit) derived from alkylene oxide (e.g., propylene oxide) during copolymerization of alkylene oxide and $CO_2$.

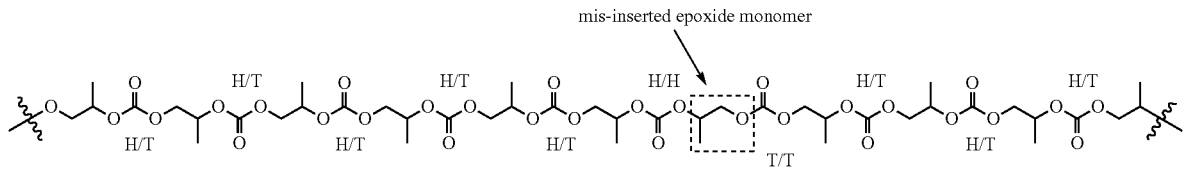 [SMILES: *OCC(C)OC(=O)OCC(C)OC(=O)OCC(C)OC(=O)OCC(C)OC(=O)OCC(C)OC(=O)OCC(C)OC(=O)OC(C)COC(=O)OCC(C)OC(=O)OCC(C)OC(=O)OCC(C)OC(=O)OCC(*)C]

40

Regioregularity expressed in this way is less than the regioselectivity of the catalyst—in the example above, the regioselectivity of the catalyst is 90% since 9 of the 10 epoxide units were regioselectivity enchained by ring opening at the "tail" carbon atom. However, this one mis-insertion results in two non head-to-tail (H/T) linkages: the head-to-head (H/H) linkage resulting from opening the mis-inserted epoxide on the "head" carbon and a subsequent tail-to-tail (T/T) linkage resulting from the regioselective enchainment of the next propylene oxide molecule. In the case of the chain-end regiochemistry (i.e. the ratio of secondary-to-primary OH end groups) the ratio will be the same as the regioselectivity of the catalyst since there is only the one linkage to the PPC chain and each mis-insertion of a terminal epoxide results in a single primary —OH end group.

In some embodiments, a poly(alkylene carbonate) polymer chain is a polyol. In some embodiments, a poly(alkylene carbonate) polymer chain comprises at least two chain termini bearing hydroxyl end groups. In some embodiments, a poly(alkylene carbonate) polymer chain is selected from a diol, a triol, and a tetrol. In some embodiments, a poly(alkylene carbonate) polymer chain is a diol. In some embodiments, the poly(alkylene carbonate) polymer chain is a triol. In some embodiments, a poly(alkylene carbonate) polymer chain is a tetraol. In some embodiments, a poly In some embodiments, a molar percent of chain termini having a secondary OH group relative to all chain termini in a poly(alkylene carbonate) polymer composition is between 0% and 95%. In some embodiments, a molar percent of chain termini bearing secondary OH end groups in a poly(alkylene carbonate) polymer composition is between about 0% and about 70%. In some embodiments, a molar percent of chain termini bearing secondary OH end groups in a poly(alkylene carbonate) polymer composition is about 0%, about 5%, about 10%, about 15%, about 20%, about 25%, about 30%, about 35%, about 40%, about 45%, about 50%, about 55%, about 60%, about 65%, about 70%, or about 80%. In some embodiments, a molar percent of chain termini bearing secondary OH end groups in a poly(alkylene carbonate) polymer composition is between about 0% and about 55%. In some embodiments, a molar percent of chain termini bearing secondary OH end groups in a poly(alkylene carbonate) polymer composition is between about 45% and about 55%. In some embodiments, a molar percent of chain termini bearing secondary OH end groups in a poly(alkylene carbonate) polymer composition is between about 0% to about 10%, about 5% to about 15%, about 10% to about 20%, about 15% to about 25%, about 20% to about 30%, about 25% to about 35%, about 30% to about 40%, about 35% to about 45%, about 40% to about 50%, or about 45% to about 55%.

In some embodiments, the present disclosure provides a regioregular poly(propylene carbonate) polymer composition comprising a population of PPC chains, each PPC chain comprising a plurality of internal repeating units and one or more free chain-ends, each internal repeating unit comprising a 1,2-propane diol moiety attached to two adjacent repeating units through carbonate linkages, and each free chain-end comprising a 1,2-propane-diol moiety having one free hydroxyl group and one carbonate linkage to the PPC chain, characterized in that, on average in the composition, the percentage of secondary hydroxyl groups among total hydroxyl groups in the free chain-ends is lower than the percentage of internal repeating groups regioselectively enchained within the polymer chains. As used herein, the term "free chain-end comprising a 1,2-propane-diol moiety" refers to a 1,2-propane diol moiety that was enchained during the polymerization reaction that formed the PPC.

By way of illustration, a 1,2-propane diol moiety attached to two adjacent repeating units through carbonate linkages refers to an poly(propylene carbonate) moiety of the following formula:

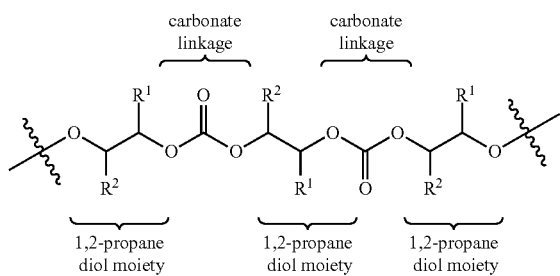

wherein each $R^1$ and $R^2$ are, in each instance, independently selected from H or methyl, wherein $R^1$ and $R^2$ are not the same, and bonds depicted crossed by the symbol ∿ represent a point of attachment to adjacent carbonate units.

In some embodiments, a free chain-end comprising a 1,2-propane-diol moiety having one free hydroxyl group and one carbonate linkage to the PPC chain refers to an alkylene carbonate moiety of the following formula:

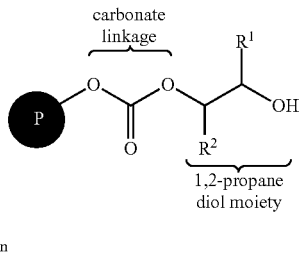

wherein $R^1$ and $R^2$ are, in each instance, each independently selected from H or methyl, wherein $R^1$ and $R^2$ are not the same.

In some embodiments, the percentage of internal repeating groups regioselectively enchained in the poly(propylene carbonate) chain is about 70-90% or about 75-85%. In some embodiments, the percentage of internal repeating groups regioselectively enchained in the poly(propylene carbonate) chain is about 90-99.9% or about 93-98%.

In some embodiments, the molar percent of primary OH end groups in the free chain-ends is greater than about 5%, greater than about 7%, greater than about 10%, or greater than about 15%. In some embodiments, the molar percent of primary OH end groups in the free chain-ends is greater than about 10%, greater than about 15%, greater than about 20%, greater than about 25%, greater than about 30%, greater than about 35%, greater than about 40%, greater than about 45%, or greater than about 50%. In some embodiments, the molar percent of primary OH end groups in the free chain-ends of a poly(alkylene carbonate) polymer is 45-55%. In some embodiments, the molar percent of primary OH end groups in the free chain-ends is greater than about 55%, greater than about 60%, greater than about 65%, greater than about 70%, greater than about 75%, greater than about 80%, greater than about 85%, greater than about 90%, or greater than about 95%. In certain embodiments, the molar percent of primary OH end groups in the free chain-ends of a poly(alkylene carbonate) polymer is 15-25%, 20-30%, 25-35%, 30-40%, 35-45%, 40-50%, 45-55%, 50-60%, 55-65%, 60-70%, 65-75%, 70-80%, 75-85%, 80-90%, 85-95%, 90-99%, or greater than 99%.

In some embodiments, the molar percent of primary OH end groups in the free chain-ends is about 35%. In some embodiments, the molar percent of primary OH end groups in the free chain-ends is about 45% to about 55%.

Cyclic Alkylene Carbonate

In some embodiments, a poly(alkylene carbonate) composition comprises cyclic alkylene carbonate (e.g., cyclic propylene carbonate ("cPC")) byproducts. In some embodiments, a poly(alkylene carbonate) polymer composition contains less than about 10, less than about 5, or less than about 2 weight percent cyclic alkylene carbonate. In some embodiments, a provided poly(alkylene carbonate) polymer composition contains less than about 10, less than about 5, or less than about 2 molar percent cyclic alkylene carbonate (e.g., cPC).

In some embodiments, provided methods of the present disclosure comprise the step of removing cyclic alkylene carbonate (e.g., cyclic propylene carbonate) molecules. In some embodiments, the cyclic alkylene carbonate is removed continuously during isomerization (e.g., during a heating step). In some embodiments, the removal of cyclic alkylene carbonate during the isomerization (e.g., the heating step) is facilitated by reduced pressure. In some embodiments, the removal of cyclic alkylene carbonate (e.g., cyclic propylene carbonate) is facilitated by gas flow. Gas flow refers to the process of flowing a stream of gas over and/or through the reaction mixture, preferably at high temperature, to remove volatiles.

Chain Transfer Agents

Poly(alkylene carbonate) polymers of the present disclosure can include polyfunctional initiators (i.e., chain transfer agents) embedded as part of the polymer molecule. Chain transfer agents are molecules having two or more sites that can initiate polymerization, and are incorporated into the poly(alkylene carbonate) polymer product.

Accordingly, in some embodiments, a chain transfer agent is a multivalent chain transfer agent. In some embodiments, a chain transfer agent is a divalent (i.e., contains two functional groups capable of initiating polymer chain growth) chain transfer agent. In some embodiments, a chain transfer agent is a trivalent chain transfer agent. In some embodiments, a chain transfer agent is a tetravalent chain transfer agent. In some embodiments, a chain transfer agent is a polyhydric alcohol. In some embodiments, a polyhydric alcohol is selected from a diol, a triol, a tetraol and a higher polyol. In some embodiments, a chain transfer agent is a polymer, for example a polyester, a polyether, or a polyolefin.

Alkylene Oxides

In some embodiments, a poly(alkylene carbonate) polymer is a polymer prepared from the copolymerization of carbon dioxide and at least one alkylene oxide having one $CH_2$ moiety (i.e., at least one carbon atom is unsubstituted). In some embodiments, at least one alkylene oxide is a monosubstituted compound of formula:

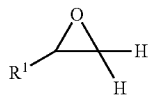

wherein $R^1$ is an optionally substituted $C_{1-32}$ alkyl, $C_{1-32}$ alkenyl, $C_{1-32}$ alkyl-$R^a$, $C_{1-32}$ alkenyl-$R^a$, $C_6$-$C_{18}$ aryl, 5 to 18 atom heteroaryl, $C_3$-$C_{18}$ cycloalkyl, or 3 to 18 atom heterocycloalkyl; and $R^a$ is halogen, hydroxyl, —$OC_{1-32}$ alkyl, —OC(O)$C_{1-32}$ alkyl, —C(O)O$C_{1-32}$ alkyl, —O$C_{1-32}$ alkenyl, —OC(O)$C_{1-32}$ alkenyl, or —C(O)O$C_{1-32}$ alkenyl. In some embodiments, $R^1$ is $C_1$-$C_{28}$ alkyl. In some embodiments, $R^1$ is $C_1$-$C_{20}$ alkyl. In some embodiments, $R^1$ is $C_1$-$C_{16}$ alkyl. In some embodiments, $R^1$ is $C_1$-$C_{12}$ alkyl. In some embodiments, $R^1$ is $C_1$-$C_{10}$ alkyl. In some embodiments, $R^1$ is $C_1$-$C_8$ alkyl. In some embodiments, $R^1$ is $C_1$-$C_6$ alkyl. In some embodiments, $R^1$ is $C_6$ alkyl. In some embodiments, $R^1$ is $C_5$ alkyl. In some embodiments, $R^1$ is $C_4$ alkyl. In some embodiments, $R^1$ is $C_3$ alkyl. In some embodiments, $R^1$ is $C_2$ alkyl. In some embodiments, $R^1$ is $C_1$ alkyl. In some embodiments, an alkylene oxide is selected from propylene oxide, 1,2-butene oxide (1,2-epoxybutane), 1,2-epoxy-2-methylpropane, 1,2-pentene oxide (1,2-epoxypentane), diisobutylene oxide, 1,2-hexene oxide, 1,2-heptene oxide, styrene oxide, epichlorohydrin, epibromohydrin, glycidyl ether, butyl glycidyl ether, allyl glycidyl ether, allyl 2,3-epoxypropyl ether, benzyl glycidyl ether, glycidyl isopropyl ether, tert-butyl glycidyl ether, glycidyl ester, glycidyl methacrylate, 1,2-epoxydecane, epoxidized oleic acid, and epoxidized methyl oleate. In some embodiments, a poly(alkylene carbonate) polymer is selected from poly (propylene carbonate), poly(butylene carbonate), poly(pentylene carbonate), and poly(1-hexene carbonate). In some embodiments, a poly(alkylene carbonate) polymer is a polymer prepared from the copolymerization of carbon dioxide and two or more alkylene oxides, wherein at least one alkylene oxide has a $CH_2$ moiety. In some embodiments, a poly(alkylene carbonate) polymer is a copolymer prepared from two or more alkylene oxides (e.g., propylene oxide and cyclohexene oxide).

In some embodiments, the present invention encompasses poly(propylene carbonate) polyol compositions with increased reactivity toward electrophilic reagents such as isocyanates. In certain embodiments, such high reactivity poly(propylene carbonate) (HRPPC) polyol compositions are characterized in that the chain ends have been isomerized to increase their primary —OH end group content. In certain embodiments such HRPPC polyol compositions are characterized in that they have greater than 20 mole percent primary —OH end groups. In certain embodiments such HRPPC polyol compositions are characterized in that they have greater than 25 mole percent, greater than 30 mole percent, greater than 35 mole percent or greater than 40 mole percent primary —OH end groups. In certain embodiments, such HRPPC polyol compositions are the product of the isomerization of a poly(propylene carbonate) polyol composition derived from the copolymerization of propylene oxide and $CO_2$ and having less than 15% —OH end groups upon completion of the copolymerization.

Other Polymer Characteristics

In some embodiments, a number average molecular weight (Mn) of a starting and/or modified poly(alkylene carbonate) polymer composition is between about 500 to about 30,000 g/mol. In some embodiments, a Mn of the starting and/or modified poly(alkylene carbonate) polymer composition is between about 1,000 and about 20,000 g/mol. In some embodiments, a Mn of the starting and/or modified poly(alkylene carbonate) polymer composition is between about 500 and about 5,000 g/mol. In some embodiments, a Mn of the starting and/or modified poly(alkylene carbonate) polymer composition is between about 1,000 and about 3,000 g/mol. In some embodiments, a Mn of the starting and/or modified poly(alkylene carbonate) polymer composition is between about 1,000 and about 2,000 g/mol. In some embodiments, a Mn of the starting and/or modified poly(alkylene carbonate) polymer composition is between about 10,000 and about 20,000 g/mol. The Mn (normalized molecular weight) and/or the Mw (weighted molecular weight) of a starting and/or modified poly(alkylene carbonate) polymer is measured according to methods known to those of skill in the art, including gel permeation chromatography (GPC). In some embodiments, a molecular weight (e.g., Mn or Mw) of a starting and/or a modified poly (alkylene carbonate) polymer composition is measured by GPC using a standard selected from poly(ethylene glycol), polyacrylic acid, polymethylmethacrylate, and polystyrene. In some embodiments, a molecular weight (e.g., Mn or Mw) of a starting and/or a modified poly(alkylene carbonate) polymer composition is measured by GPC using a polystyrene standard. In some embodiments, a molecular weight (e.g., Mn or Mw) of a starting and/or a modified poly (alkylene carbonate) polymer composition is measured by GPC using a poly(ethylene glycol) standard. In some embodiments, a molecular weight (e.g., Mn or Mw) of a starting and/or a modified poly(alkylene carbonate) polymer composition is measured by GPC using a polyacrylic acid standard. In some embodiments, a molecular weight (e.g., Mn or Mw) of a starting and/or a modified poly(alkylene carbonate) polymer composition is measured by GPC using a polymethylmethacrylate standard.

A person of skill in the art would understand how to characterize any of the poly(alkylene carbonate) polymer compositions reported herein. Exemplary methods of characterization include $^1H$ NMR, $^{13}C$ NMR, GPC, and $^{19}F$ NMR, as reported in ASTM D4273-99. *Standard Test Methods for Polyurethane Raw Materials: Determination of Primary Hydroxyl Content of Polyether Polyols*. In some embodiments, the molar percent of primary and secondary OH end groups is determined by $^1H$ NMR.

In some embodiments, the head-to-tail ratio of enchained carbonate monomer groups is determined by NMR. In some embodiments, the head-to-tail ratio of enchained carbonate monomer groups is determined by $^{13}C$ NMR spectroscopy. Suitable methods for determining the head-to-tail ratio of poly(alkylene carbonates) and for ascertaining the regioselectivity of particular epoxide $CO_2$ copolymerization catalysts are known in the art. For example, the methods described in *J. Am. Chem. Soc.* 2004, 126, 11030-11039; *Angew. Chem. Int. Ed.* 2004, 43, 3574-3577; *Macromolecules* 2002, 35, 6494-6504; *Macromolecules* 2013, 46, 3693-3697; and *J. Appl. Polym. Sci.* 2014, 41141 are suitable. These references, along with associated published supporting information (if any) are hereby incorporated herein in their entirety.

It is possible to determine the number average molecular weight (Mn) of poly(alkylene carbonate) polymer compositions reported herein using methods well known in the art. Exemplary methods of determining Mn include gel permeation chromatography (GPC), and integration of $^1$H NMR spectra (e.g. by quantitative comparison of the magnitude $^1$H NMR resonances associated with chain end monomer units relative to resonances associated with intrachain monomer units and, if present, any embedded CTAs).

Further, it is possible to determine an amount of cyclic alkylene carbonate generated during the isomerization reaction using such methods as $^1$H NMR, infrared spectroscopy or gas chromatography. In some embodiments, therefore, the molar and/or weight percent of cyclic alkylene carbonate is determined by $^1$H NMR. In some embodiments, therefore, the molar and/or weight percent of cyclic alkylene carbonate is determined by infrared spectroscopy. In some embodiments, therefore, the molar and/or weight percent of cyclic alkylene carbonate is determined by gas chromatography.

Higher Polymers

In some embodiments, the present invention encompasses higher polymers derived from the reaction of a modified polyol composition described above with a polyfunctional reactant. In certain embodiments, such polyfunctional reactants are selected from the group consisting of polyisocyanates, melamines and phenol-formaldehyde resins. In certain embodiments, such higher polymers are derived from the reaction of a polyfunctional reactant with a mixture of polyols comprising a modified polyol composition described above in combination with one or more additional polyols selected from the group consisting of polyether polyols, polyester polyols, and polyether carbonate polyols.

In certain embodiments, the present invention encompasses polyurethane compositions derived from the reaction of a modified polyol composition described above with a polyisocyanate. In certain embodiments, such polyurethane compositions are derived from the reaction of a polyisocyanate with a mixture of polyols comprising a modified polyol composition described above in combination with one or more additional polyols selected from the group consisting of polyether polyols, polyester polyols, and polyether carbonate polyols. In certain embodiments, such polyurethanes comprise flexible foam compositions. In certain embodiments, such polyurethanes comprise rigid foam compositions. In certain embodiments, such polyurethanes comprise adhesive compositions. In certain embodiments, such polyurethanes comprise coating compositions. In certain embodiments, such polyurethanes comprise flexible elastomer compositions. In certain embodiments, such polyurethanes comprise flexible sealant compositions. In certain embodiments, such polyurethanes comprise thermoplastic polyurethane compositions. In certain embodiments, the invention comprises articles of manufacture comprising one or more of the above polyurethane compositions.

Mechanistic Insights

Regioselectivity of Preparing Poly(Alkylene Carbonate) Polymers

The regiochemistry of the end group of a poly(alkylene carbonate) polymer (e.g., a primary versus a secondary hydroxyl group) is generally determined by the method of polymerization (e.g., type of polymerization catalyst). During copolymerization of substituted epoxides (e.g., propylene oxide) and $CO_2$, the epoxide can open at two different positions, leading to various regioisomers of the opened epoxide once incorporated into the polymer chain. For example, propylene oxide has two carbon atoms that may be attacked by the growing polycarbonate chain: a "head" carbon atom and a "tail" carbon atom:

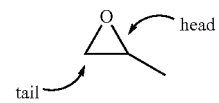

During the copolymerization reaction, the terminal $CO_2$ on the growing polycarbonate chain can open the epoxide ring at either the tail carbon or the head carbon (Scheme 1):

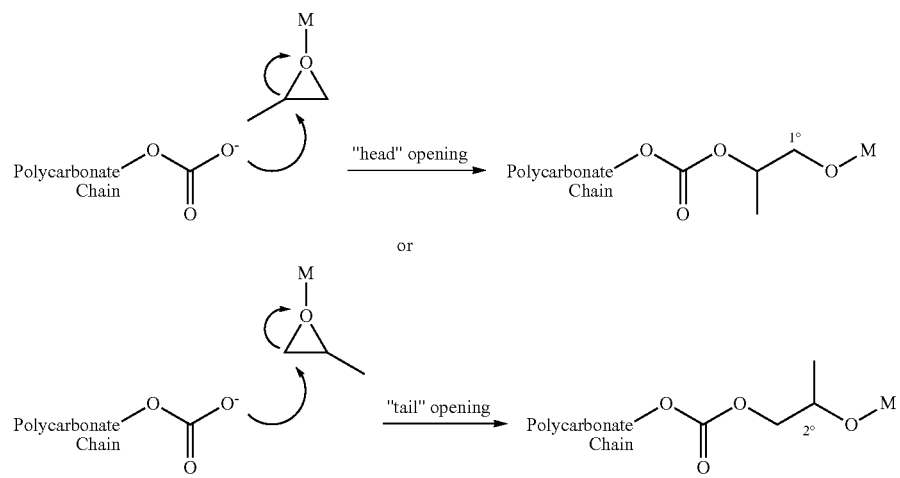

As can be seen, upon quench of the copolymerization reaction, any polymer chain-end terminating with a propylene oxide unit having opened at the "tail" will result in a secondary hydroxyl end group upon protonating the terminal oxygen.

As the polycarbonate continues to grow, four combinations of regioselectivity are possible between any given diad of poly(propylene carbonate) units: head-to-head (where the head of one epoxide faces the head of another in a diad), head-to-tail (where the head of one epoxide faces the tail of another in a diad), tail-to-head (where the tail of one epoxide faces the head of another in a diad), and tail-to-tail, (where the tail of one epoxide faces the tail of another in a diad) (Scheme 2):

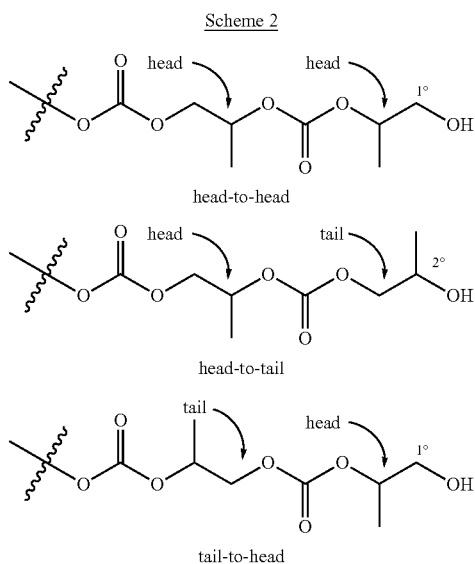

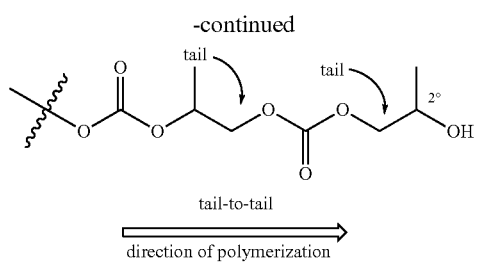

When the final epoxide is enchained in a given polycarbonate polymer chain, if the $CO_2$ opens the epoxide at the tail carbon (which is the less sterically inhibited site), a head carbon will be at the terminus, resulting in a secondary hydroxyl group as the end group in the polycarbonate. In the event the $CO_2$ opens at the head site (which is the more sterically inhibited site), the tail group will be terminal, resulting in a primary hydroxyl group. Without wishing to be bound by theory, in certain epoxide-$CO_2$ co-polymerization systems, it is presumed that sterics favor opening the epoxide at the tail site, which is less sterically inhibited, making the polymerization reaction prone to a high degree of head-to-tail regioselectivity. Such regioselectivity would result in poly(alkylene carbonate) polymer having mostly secondary hydroxyl end groups.

The higher the likelihood that the polymerization proceeds in a head-to-tail fashion, the higher the likelihood that the end group will be a secondary hydroxyl end group. Generally, the catalysts employed to prepare these poly (alkylene carbonate) polymers produce poly(alkylene carbonate) polymers having substantial amounts of head-to-tail enchainment within the polymer molecules. Such regularity of orientation (e.g., head-to-tail) is referred to as "regioregularity" (see also, paragraph [0052]).

Poly(Alkylene Carbonate) Polymer Rearrangement

Without wishing to be bound by theory, it is proposed that elevating the temperature of the polymer composition facilitates rearrangement of secondary hydroxyl end groups into primary hydroxyl end groups via a hemi orthocarbonate intermediate. For example, as illustrated in Scheme 3:

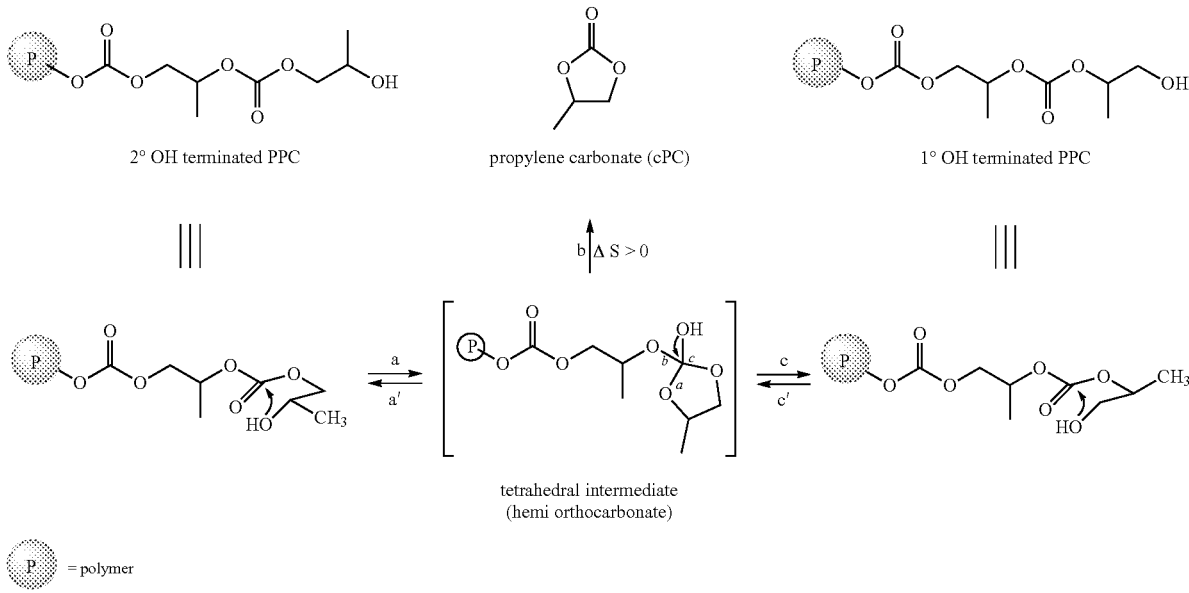

As shown starting on the left of the bottom row in Scheme 3, the secondary hydroxyl group can backbite the carbonyl group of the carbonate, resulting in the tetrahedral intermediate in brackets (path a). In some instances, the unstable hemi orthocarbonate will cleave, resulting in cyclic propylene carbonate separating from the polymer (path b). In some instances, the tetrahedral intermediate will open via path c', resulting in a primary hydroxyl terminated polymer. This entire process, however, can occur in reverse, with the primary hydroxyl group backbiting the carbonyl group of the carbonate, forming the tetrahedral intermediate (path c), which can then reopen via path a' to yield a secondary hydroxyl terminated polymer. The sporadic rearrangement of primary and secondary hydroxyl end groups in these polymers presents a problem for those in the field of polyurethanes, where it can be important to understand and/or control the relative amounts of primary and secondary hydroxyl end groups in a polycarbonate polymer composition. Therefore, as the first disclosed recognition of the interconversion of primary and secondary terminal hydroxyl groups in poly(alkylene carbonate) polymers via the above-described isomerization, the present invention encompasses the recognition of a source of a previously unknown problem in the field of polycarbonates and polyurethanes.

The methods and compositions of the present disclosure allow for the preparation of poly(alkylkene carbonate) polymers having the predicted percentage of head-to-tail enchainment, but do not have the predicted end group regiochemistry—i.e., where it is expected that the poly(alkylene carbonate) end group would have a high percentage secondary hydroxyl groups, the compositions described herein have unexpectedly high proportions of primary hydroxyl groups. It is relevant to note that the end groups achieved by the provided methods are derived from the alkylene oxide used as part of the copolymerization reaction, and are not additional groups (including those derived from alkylene oxides) that are attached post polymerization. Such a distinction is relevant as compared to previous disclosures, where end group modifications, including those to provide primary hydroxyl groups, are performed by adding additional moieties to the chain ends after the copolymerization of monomers comprising the polymer backbone.

Further, it is contemplated that, in some embodiments, it may be possible to promote and/or stabilize the formation of primary OH end groups by the addition of agents that promote and/or stabilize such primary OH end groups. In some embodiments, a stabilization agent can be added to a reaction mixture comprising a starting poly(alkylene carbonate) polymer. In some embodiments, a stabilization agent favors or stabilizes formation of the primary hydroxyl end group over secondary hydroxyl end group under conditions disclosed herein that promote OH end group rearrangement. In some embodiments, an agent that promotes the formation of primary OH end groups can be added to a starting poly(alkylene carbonate) polymer as a further component of methods described herein. In some embodiments, an agent that promotes the formation of primary OH end groups acts in a catalytic manner.

EXEMPLARY EMBODIMENTS

Embodiment 1

A method for increasing the ratio of primary to secondary OH end groups of a poly(propylene carbonate) ("PPC") polymer composition, the method comprising the step of heating a starting PPC polymer composition to provide a modified PPC polymer composition wherein the modified PPC polymer composition has a higher ratio of primary to secondary OH end groups than the starting PPC polymer composition.

Embodiment 2

The method of Embodiment 1, wherein the starting PPC polymer composition is substantially free of copolymerization catalyst and the heating step comprises treating the starting PPC polymer composition at a temperature in the range of about 100° C. to about 180° C.

Embodiment 3

The method of Embodiment 1, further comprising the step of copolymerizing propylene oxide and $CO_2$ in the presence of a copolymerization catalyst to form a reaction mixture comprising unquenched copolymerization catalyst and the starting PPC polymer composition.

Embodiment 4

The method of Embodiment 3 further comprising the step of adding a quenching agent to the reaction mixture suitable to end the copolymerization reaction and provide a reaction mixture comprising quenched copolymerization catalyst and the starting PPC polymer composition.

Embodiment 5

The method of Embodiment 3 or 4, comprising venting the $CO_2$ from the reaction mixture.

Embodiment 6

The method of Embodiment 4 or 5, comprising treating the reaction mixture comprising quenched copolymerization catalyst and starting PPC polymer composition at a temperature in the range of about 50° C. to about 120° C.

Embodiment 7

The method of Embodiment 3 wherein the reaction mixture comprising unquenched copolymerization catalyst and starting PPC polymer composition is heated.

Embodiment 8

The method of Embodiment 7, comprising venting the $CO_2$ from the reaction mixture.

Embodiment 9

The method of Embodiments 7 or 8, comprising heating the reaction mixture comprising unquenched copolymerization catalyst and starting PPC polymer composition to a temperature in the range of about 50° C. to about 85° C.

Embodiment 10

The method of any one of Embodiments 7 to 9, wherein a quenching agent suitable to end the copolymerization reaction is added to the reaction mixture after the heating step.

Embodiment 11

The method of Embodiment 10, wherein the quenching agent is added to the reaction mixture after the ratio of primary to secondary OH end groups has increased to a desired level and/or by a desired amount.

Embodiment 12

The method of any one of the preceding Embodiments, wherein an amount of cyclic propylene carbonate formed during the heating step is less than about 10 weight percent, about 9 weight percent, about 8 weight percent, about 7 weight percent, about 6 weight percent, about 5 weight percent, about 4 weight percent, about 3 weight percent, about 2 weight percent, or about 1 weight percent relative to the starting PPC polymer.

Embodiment 13

The method of any one of the preceding Embodiments, wherein the heating step is performed in a continuous flow format.

Embodiment 14

The method of Embodiment 13 further comprising drawing the starting PPC composition from a feed reservoir, flowing the PPC through a heated zone and accumulating the modified PPC composition in a product reservoir.

Embodiment 15

The method of any one of the preceding Embodiments, further comprising the step of removing cyclic propylene carbonate ("cPC").

Embodiment 16

The method of Embodiment 15, wherein the cPC is removed continuously during the heating step.

Embodiment 17

The method of Embodiment 16, wherein the removal of the cPC during the heating step is facilitated by reduced pressure.

Embodiment 18

The method of Embodiment 16, wherein the removal of the cPC during the heating step is facilitated by a gas flow.

Embodiment 19

The method of any one of the preceding Embodiments, wherein the starting PPC polymer composition has an Mn of about 500 to about 30,000 g/mol.

Embodiment 20

The method of any one of the preceding Embodiments, wherein the molar percent of primary OH end groups in the modified PPC polymer composition is at least 15%, at least 20%, at least 25%, at least 30%, at least 35%, at least 40%, at least 45%, at least 50%, or at least 51% greater than the molar percent of primary OH end groups in the starting PPC polymer.

Embodiment 21

The method of any one of the preceding Embodiments, wherein the ratio of primary OH end groups to secondary OH end groups in the modified PPC polymer composition is at least 50% greater than the ratio of primary OH end groups to secondary OH end groups in the starting PPC polymer composition.

Embodiment 22

The method of Embodiment 21, wherein the ratio of primary OH end groups to secondary OH end groups in the modified PPC polymer composition is at least 75%, at least 100%, at least 150%, at least 200%, at least 300%, at least 400%, or at least 500% greater than the ratio of primary OH end groups to secondary OH end groups in the starting PPC polymer composition.

Embodiment 23

The method of Embodiment 20, wherein the molar percent of primary OH end groups in the modified PPC polymer composition is about 35% greater than the molar percent of primary OH end groups in the starting PPC polymer.

Embodiment 24

The method of Embodiment 20, wherein the molar percent of primary OH end groups in the modified PPC polymer composition is at least 45% greater than the molar percent of primary OH end groups in the starting PPC polymer.

Embodiment 25

The method of Embodiment 20, wherein the molar percent of primary OH end groups in the modified PPC polymer composition is at least 70%, at least 75%, at least 80%, at least 85%, at least 90%, or at least 95% greater than the molar percent of primary OH end groups in the starting PPC polymer.

Embodiment 26

The method of Embodiment 20, wherein the molar percent of primary OH end groups in the starting PPC polymer composition is less than 15%, less than 10%, less than 8%, less than 5%, or less than 3%, or less than 2%.

Embodiment 27

The method of any one of the preceding Embodiments, wherein the molar percent of primary and secondary OH end groups is determined by $^1$H NMR.

Embodiment 28

The method of any one of the preceding Embodiments, wherein the molar percent of the cPC is determined by $^1$H NMR.

Embodiment 29

A poly(propylene carbonate) ("PPC") polymer composition comprising a plurality of poly(propylene carbonate) polymer chains, wherein the poly(propylene carbonate) chains comprise isopropylene moieties separated by carbonate linkages and are characterized in that the degree of regioregularity for intramolecular isopropylene moieties within poly(propylene carbonate) polymer chains is higher than the regioregularity for at least one chain terminus.

Embodiment 30

A poly(propylene carbonate) ("PPC") polymer composition comprising a plurality of poly(propylene carbonate) polymer chains, where the poly(propylene carbonate) chains contain isopropylene moieties separating each carbonate linkage, characterized in that a percentage of intrapolymer adjacent isopropylene moieties are arranged in a head-to-tail enchainment, and a percentage of secondary OH end groups is less than a percentage of intrapolymer carbonate units arranged in a head-to-tail enchainment.

Embodiment 31

The PPC polymer composition of Embodiments 29 or 30, wherein the propylene moieties separated by carbonate linkages are arranged in a head-to-tail enchainment, and are represented by:

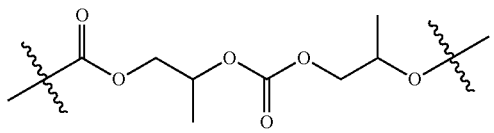 [SMILES: *OC(C)COC(=O)OC(C)COC(*)=O]

wherein a bond crossed by a ∿ symbol represents a point of attachment to an adjacent carbonate unit.

Embodiment 32

The PPC polymer composition of Embodiments 29 or 30, wherein a chain terminus bearing a primary OH end group is represented by:

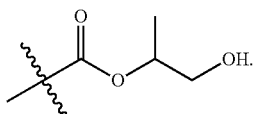 [SMILES: *C(=O)OC(C)CO]

wherein a bond crossed by a ∿ symbol represents a point of attachment to an adjacent carbonate unit.

Embodiment 33

The PPC polymer composition of Embodiment 32, wherein on average in the composition each polymer chain comprises at least one primary OH end group.

Embodiment 34

The PPC polymer composition of any one of Embodiments 29 to 33, wherein the PPC polymer is a polyol.

Embodiment 35

The PPC polymer composition of Embodiment 34, wherein the PPC polymer is selected from a diol, a triol, and a tetraol.

Embodiment 36

The PPC polymer composition of any one of Embodiments 29 to 35, wherein the PPC polymer comprises an embedded chain transfer agent.

Embodiment 37

The PPC polymer composition of Embodiment 36, wherein the chain transfer agent is a multivalent chain transfer agent.

Embodiment 38

The PPC polymer composition of Embodiment 37, wherein the chain transfer agent is a divalent chain transfer agent.

Embodiment 39

The PPC polymer composition of Embodiment 37, wherein the chain transfer agent is a trivalent chain transfer agent.

Embodiment 40

The PPC polymer composition of Embodiment 37, wherein the chain transfer agent is a tetravalent chain transfer agent.

Embodiment 41

The PPC polymer composition of any one of Embodiments 29 to 40, wherein the head-to-tail enchainment of propylene groups in the polymer chain is about 70-90% or about 75-85%.

Embodiment 42

The PPC polymer composition of any one of Embodiments 29 to 41, wherein the head-to-tail enchainment of propylene groups in the polymer chain is about 90-99.9% or about 93-98%.

Embodiment 43

The PPC polymer composition of any one of Embodiments 29 to 42, wherein the molar percent of primary OH end groups is greater than about 5%, greater than about 7%, greater than about 10%, or greater than about 15%.

Embodiment 44

The PPC polymer composition of any one of Embodiments 29 to 43, wherein the molar percent of primary OH end groups is greater than about 10%, greater than about 15%, greater than about 20%, greater than about 25%, greater than about 30%, greater than about 35%, greater than about 40%, greater than about 45%, or greater than about 50%.

Embodiment 45

The PPC polymer composition of Embodiment 44, wherein the molar percent of primary OH end groups is about 35%.

Embodiment 46

The PPC polymer composition of Embodiment 44, wherein the molar percent of primary OH end groups is 45-55%.

Embodiment 47

The PPC polymer composition of Embodiment 44, wherein the molar percent of primary OH end groups is greater than about 70%, greater than about 75%, greater than about 80%, greater than about 85%, greater than about 90%, or greater than about 95%.

Embodiment 48

The PPC polymer composition of any one of Embodiments 29 to 47, wherein the majority of primary OH end groups are located on a propylene unit derived from propylene oxide during copolymerization of propylene oxide and $CO_2$.

Embodiment 49

The PPC polymer composition of any one of Embodiments 29 to 48, wherein the polymer composition contains less than about 10, less than about 5, or less than about 2 molar percent cyclic propylene carbonate.

Embodiment 50

The PPC polymer composition of any one of Embodiments 29 to 49, wherein the PPC polymer composition is isolated.

Embodiment 51

The PPC polymer composition of any one of Embodiments 29 to 50, wherein the PPC polymer composition is purified.

Embodiment 52

The PPC polymer composition of any one of Embodiments 29 to 51, comprising at least 100 mg, at least 1 g, or at least 1 kg of PPC polymer.

Embodiment 53

The PPC polymer composition of any one of Embodiments 29 to 52, having an Mn of about 500 to about 30,000 g/mol.

Embodiment 54

The PPC polymer composition of any one of Embodiments 29 to 53, wherein the molar percent of primary OH end groups and the molar percent of cyclic propylene carbonate is determined by $^1$H NMR.

Embodiment 55

A method for increasing the ratio of primary to secondary OH end groups of a poly(propylene carbonate) ("PPC") polymer composition, the method comprising the step of contacting a starting PPC polymer composition with an isomerization catalyst to provide a modified PPC polymer composition wherein the modified PPC polymer composition has a higher ratio of primary to secondary OH end groups than the starting PPC polymer composition.

Embodiment 56

The method of Embodiment 55, wherein the isomerization catalyst is a Lewis or Brönsted Acid, or a Lewis or Brönsted Base.

Embodiment 57

The method of Embodiment 56, wherein the isomerization catalyst is a Lewis or Brönsted Acid.

Embodiment 58

The method of Embodiment 57, wherein the isomerization catalyst is a transition metal Lewis Acid, a main group Lewis acid, an alkali Lewis Acid, or an alkaline Lewis Acid.

Embodiment 59

The method of Embodiment 57, wherein the isomerization catalyst is a hydrogen halide, a hydrogen phosphate, an aluminum oxide, a boronic acid, a boronic ester, an alkyl borane, an aryl borane, an ammonium acid, a sulfonic acid, or a zeolite.

Embodiment 60

The method of Embodiments 58 or 59, wherein the isomerization catalyst is selected from zinc chloride, zinc bromide, zinc fluoride, zinc triflate, zinc oxide, aluminum chloride, aluminum bromide, aluminum fluoride, aluminum triflate, tin chloride, tin oxide, dibutyltin dilaurate, molybdenum dichloro dioxide, iron (II) chloride, iron (III) chloride, silica chloride, magnesium chloride, manganese chloride, cobalt (II) chloride, titanium chloride, copper bromide, copper triflate, lithium chloride, hydrogen chloride, hydrogen bromide, hydrogen iodide, hydrogen fluoride, boric acid, triphenylborane, trifluoroborane, tris(pentafluorophenyl)borane, fluoroantimonic acid, perchloric acid, trifluoromethanesulfonic acid, triflic anhydride, antimony pentafluoride, tetrabutylammonium bromide, tetrabutylphosphonium bromide, cesium triflate, chromium acetate, acetic acid, sulfuric acid, p-toluene sulfonic acid, methane sulfonic acid, ethane sulfonic acid, 1-propane sulfonic acid, trifluoromethyl sulfonic acid, 4-nitrophenyl sulfonic acid, sulfoacetic acid, cumenesulphonic acid, vylene sulfonic acid, 3-amino-1-1-propanesulfonic acid, 2-(methylamino)ethanesulfonic acid, 2-aminoethanesulfonic acid, 2-sulfanylethanesulfonic acid, 3-hydroxy-1-propanesulfonic acid, benzenesulfonic acid, 3-pyridinesulfonic acid, 2-pyridinesulfonic acid, 4-piperidinesulfonic acid, 2-aminobenzenesulfonic acid, 1-methylpyridinium 3-sulfonate, 1-methyl-2-pyridiniumsulfonate, 4-hydroxybenzenesulfonic acid, cyclohexane sulfonic acid, 4-ethylbenzenesulfonic acid, 2,5-dimethylbenzenesulfonic acid, 4-methylmetanilic acid, 4-amino-3-methylbenzenesulfonic acid, 1-Naphthalenesulfonic acid, 2-amino-5-methylbenzenesulfonic acid, perfluorooctane sulfonic acid, sulfamic acid, phosphoric acid, pyrophosphoric acid, triphosphoric acid, an alkyl derivative of phosphoric acid, pyrophosphoric acid, triphosphoric acid, an aryl derivative of phosphoric acid, pyrophosphoric acid, zinc glutarate, (beta-diiminate) zinc acetate, perfluorosulfonic acid polymer, or any combination thereof.

Embodiment 61

The method of Embodiment 58, wherein the isomerization catalyst is a boron-containing Lewis acid.

Embodiment 62

The method of Embodiment 61, wherein the isomerization catalyst is selected from the group consisting of: boric acid, a boronic ester, an alkyl borane, and an aryl borane.

Embodiment 63

The method of Embodiment 62, wherein the isomerization catalyst is boric acid.

Embodiment 64

The method of Embodiment 56, wherein the isomerization catalyst is a Lewis or Brönsted Base.

Embodiment 65

The method of Embodiment 64, wherein the isomerization catalyst is an alkali carboxylate, an alkaline carboxylate, an alkyl amine, an aromatic amine, a phosphine, a phosphazene, an alkyl thiolate, an aryl thiolate, an alkali phosphate, an alkaline phosphate, a transition metal hydroxide, a transition metal oxide, an alkaline carbonate, an alkaline bicarbonate, an alkali carbonate, an alkali bicarbonate, or a phosphine oxide.

Embodiment 66

The method of Embodiment 65, wherein the isomerization catalyst is lithium acetate, calcium stearate, ammonia, 1,8-diazabicyclo[5.4.0]undec-7-ene (DBU), 1,5,7-triazabicylo[4.4.0]dec-5-ene (TBD), 7-methyl-1,5,7-triazabicyclo[4.4.0]dec-5-ene (MTBD), 1,4-diazabicyclo[2.2.2]octane (DABCO), trimethylamine, lutidine, 4-dimethylaminopyridine, tetramethylethylenediamine, diisopropylamine, imidazole, 1-methylimidazole, 1-phenethylimidazole, 1-isopropylimidazole, pyridine, tributylphosphine, triphenylphosphine, triphenylphosphine oxide, bis(triphenylphosphine) iminium chloride, potassium thiophenolate, sodium thiophenolate, trisodium phosphate, tricalcium phosphate, aluminum hydroxide, tin oxide, calcium carbonate, lithium carbonate, potassium hydroxide, sodium hydroxide, diethyl zinc, trimethyl aluminum, dimethyl copper, potassium phosphate, potassium carbonate, sodium bicarbonate, $MoOCl_2$, or any combination thereof.

Embodiment 67

The method of Embodiment 66, wherein the isomerization catalyst is calcium stearate.

Embodiment 68

The method of any one of Embodiments 55-67, wherein the isomerization catalyst is contacted with the starting PPC polymer for between about 1 minute to about 120 hours.

Embodiment 69

The method of any one of Embodiments 55-68, wherein the isomerization catalyst comprises or is bound to a solid support.

Embodiment 70

The method of Embodiment 69, wherein the solid support is an inorganic solid support or a polymeric solid support.

Embodiment 71

The method of Embodiment 70, wherein the inorganic solid support is selected from silica, alumina, zirconia, titania, zeolites, metal oxides, and clays.

Embodiment 72

The method of Embodiment 71, wherein the polymeric solid support is styrene, chloromethylated styrene and divynylbenzene, polystyrenes, polysulfones, nylons, poly(chloromethyl styrene), polyolefins, polymethylmethacrylate, cross-linked ethoxylate acrylate resin polymers, or combinations of any of these.

Embodiment 73

The method of Embodiment 69, wherein the isomerization catalyst is Amberlyst-15, poly(4-vinylpyridine), montmorillite K-10, montmorillite KSF, zeolite, alumina, silica, a solid supported sulfonic acid, Naffion-H, $HBF_4$ on $SiO_2$, or $HClO_4$ on $SiO_2$.

Embodiment 74

The method of any one of Embodiments 55-73 wherein the starting PPC polymer composition is contacted with two different isomerization catalysts.

Embodiment 75

The method of Embodiment 74, wherein the isomerization catalysts are boric acid and calcium stearate.

Embodiment 76

The method of any one of Embodiments 55-75, further comprising the step of heating the starting PPC polymer composition and isomerization catalyst.

Embodiment 77

The method of Embodiment 76, wherein the heating step comprises heating the starting PPC polymer composition and isomerization catalyst at a temperature in the range of about 50° C. to about 140° C.

Embodiment 78

The method of Embodiment 77, wherein the heating step comprising treating the starting PPC polymer composition and isomerization catalyst at a temperature in the range of about 80° C. to about 130° C.

Embodiment 79

The method of Embodiment 78, wherein the heating step comprising treating the starting PPC polymer composition and isomerization catalyst at a temperature in the range of about 90° C. to about 120° C.

Embodiment 80

The method of Embodiment 79, wherein the heating step comprising treating the starting PPC polymer composition and isomerization catalyst at a temperature in the range of about 90° C. to about 100° C.

Embodiment 81

The method of Embodiment 80, wherein the heating step comprising treating the starting PPC polymer composition and isomerization catalyst at a temperature of about 90° C.

Embodiment 82

The method of Embodiment 79, wherein the heating step comprising treating the starting PPC polymer composition and isomerization catalyst at a temperature of about 120° C.

Embodiment 83

The method of Embodiment 81, wherein the isomerization catalyst is calcium stearate, and the starting PPC polymer and boric acid are heated to a temperature of about 90° C.

Embodiment 84

The method of Embodiment 82, wherein the isomerization catalyst is boric acid, and the starting PPC polymer and boric acid are heated to a temperature of about 120° C.

Embodiment 85

The method of any one of the preceding Embodiments, wherein the starting PPC polymer composition is substantially free of a copolymerization catalyst.

Embodiment 86

The method of any one of the preceding Embodiments, wherein the mass ratio of isomerization catalyst to starting PPC polymer composition is less than 1:10, less than 1:20, less than 1:50, less than 1:100, less than 1:200, less than 1:500, less than 1:1000, or less than 1:5000.

Embodiment 87

The method of any one of the preceding Embodiments, wherein an amount of cyclic propylene carbonate formed during the heating step is less than about 10 weight percent, about 9 weight percent, about 8 weight percent, about 7 weight percent, about 6 weight percent, about 5 weight percent, about 4 weight percent, about 3 weight percent, about 2 weight percent, or about 1 weight percent relative to the starting PPC polymer.

Embodiment 88

The method of any one of the preceding Embodiments, wherein the starting PPC polymer composition has an Mn of about 500 to about 30,000 g/mol.

Embodiment 89

The method of any one of the preceding Embodiments, wherein the molar percent of primary OH end groups in the modified PPC polymer composition is at least 15%, at least 20%, at least 25%, at least 30%, at least 35%, at least 40%, at least 45%, at least 50%, or at least 51% greater than the molar percent of primary OH end groups in the starting PPC polymer.

Embodiment 90

The method of any one of the preceding Embodiments, wherein the ratio of primary OH end groups to secondary OH end groups in the modified PPC polymer composition is at least 50% greater than the ratio of primary OH end groups to secondary OH end groups in the starting PPC polymer composition.

Embodiment 91

The method of Embodiment 90, wherein the ratio of primary OH end groups to secondary OH end groups in the modified PPC polymer composition is at least 75%, at least 100%, at least 150%, at least 200%, at least 300%, at least 400%, or at least 500% greater than the ratio of primary OH end groups to secondary OH end groups in the starting PPC polymer composition.

Embodiment 92

The method of Embodiment 89, wherein the molar percent of primary OH end groups in the modified PPC polymer composition is about 35% greater than the molar percent of primary OH end groups in the starting PPC polymer.

Embodiment 93

The method of Embodiment 89, wherein the molar percent of primary OH end groups in the modified PPC polymer composition is at least 45% greater than the molar percent of primary OH end groups in the starting PPC polymer.

Embodiment 94

The method of Embodiment 89, wherein the molar percent of primary OH end groups in the modified PPC polymer composition is at least 70%, at least 75%, at least 80%, at least 85%, at least 90%, or at least 95% greater than the molar percent of primary OH end groups in the starting PPC polymer.

Embodiment 95

The method of Embodiment 89, wherein the molar percent of primary OH end groups in the starting PPC polymer composition is less than 15%, less than 10%, less than 8%, less than 5%, or less than 3%, or less than 2%.

Embodiment 96

The method of any one of the preceding Embodiments, wherein the modified PPC polymer does not comprise a polyether end cap.

Embodiment 97

The method of any one of the preceding Embodiments, wherein the molar percent of primary and secondary OH end groups is determined by $^1$H NMR.

Embodiment 98

The method of any one of the preceding Embodiments, wherein the molar percent of the cPC is determined by $^1$H NMR.

EXEMPLIFICATION

Sample Characterization

Figure 8:
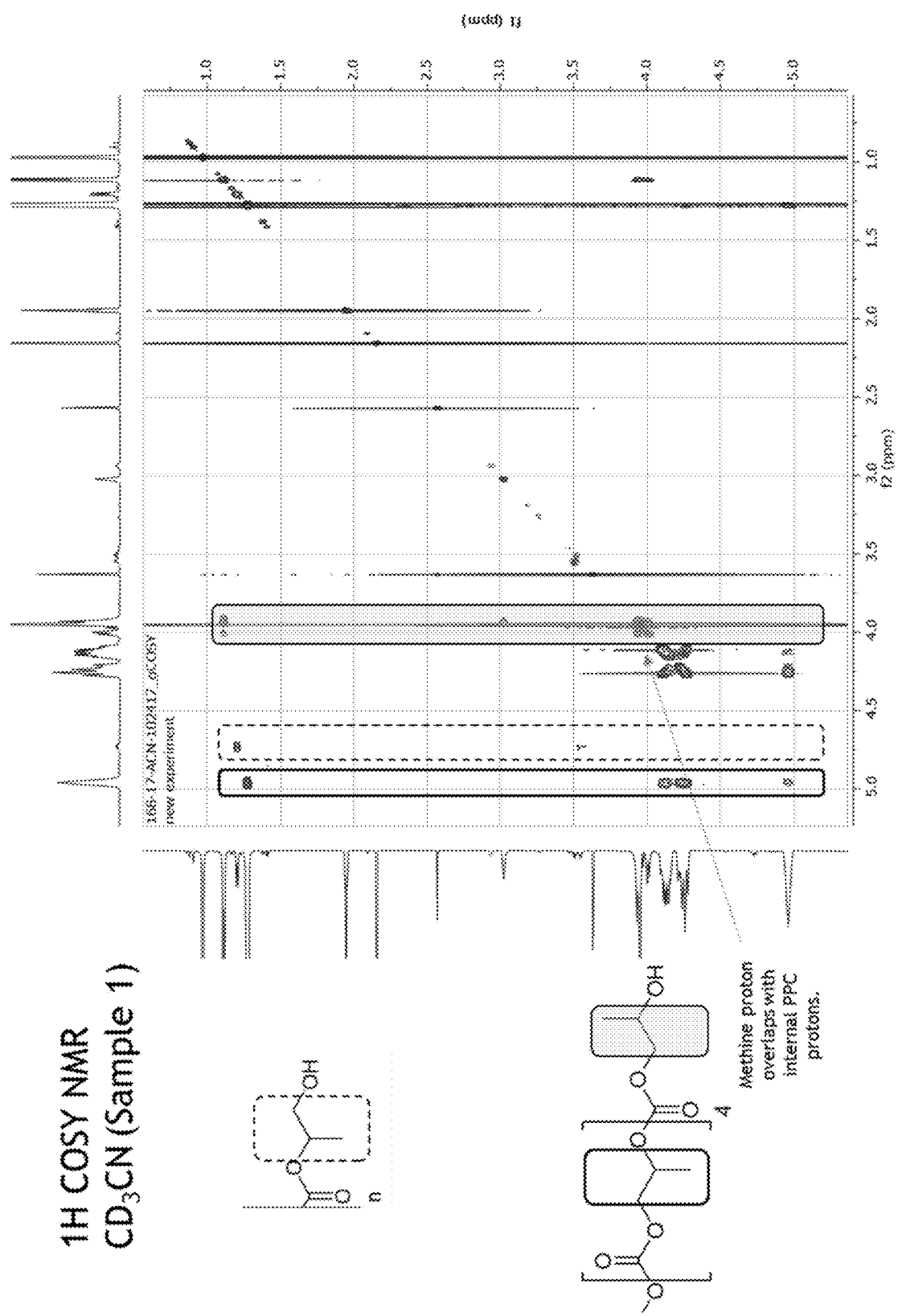
FIG. 8 is a $^1$H COSY NMR spectrum of PPC Sample 1 in CD$_3$CN.
Figure 9:
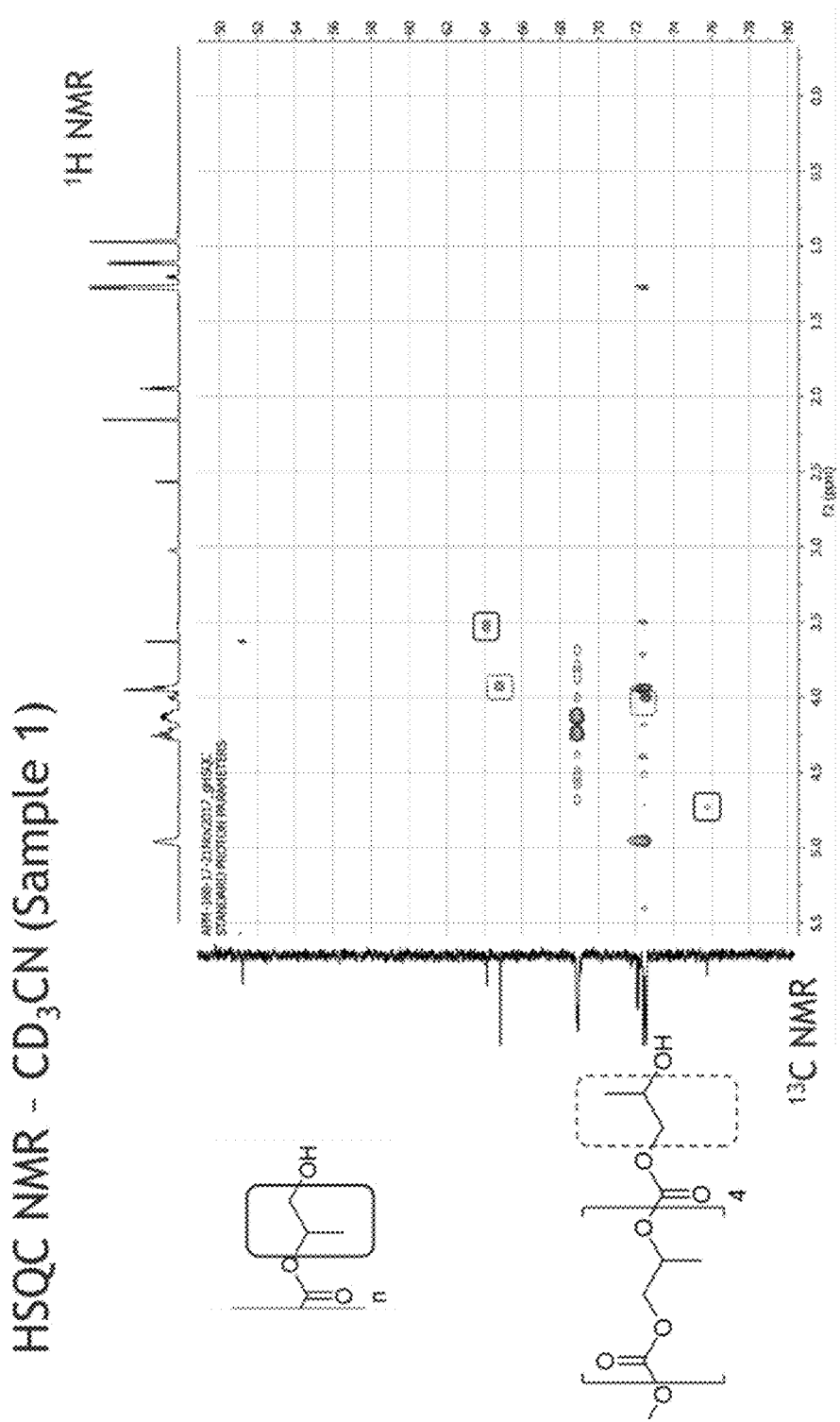
FIG. 9 is an HSQC NMR spectrum of PPC Sample 1 in CD$_3$CN.
Figure 10:
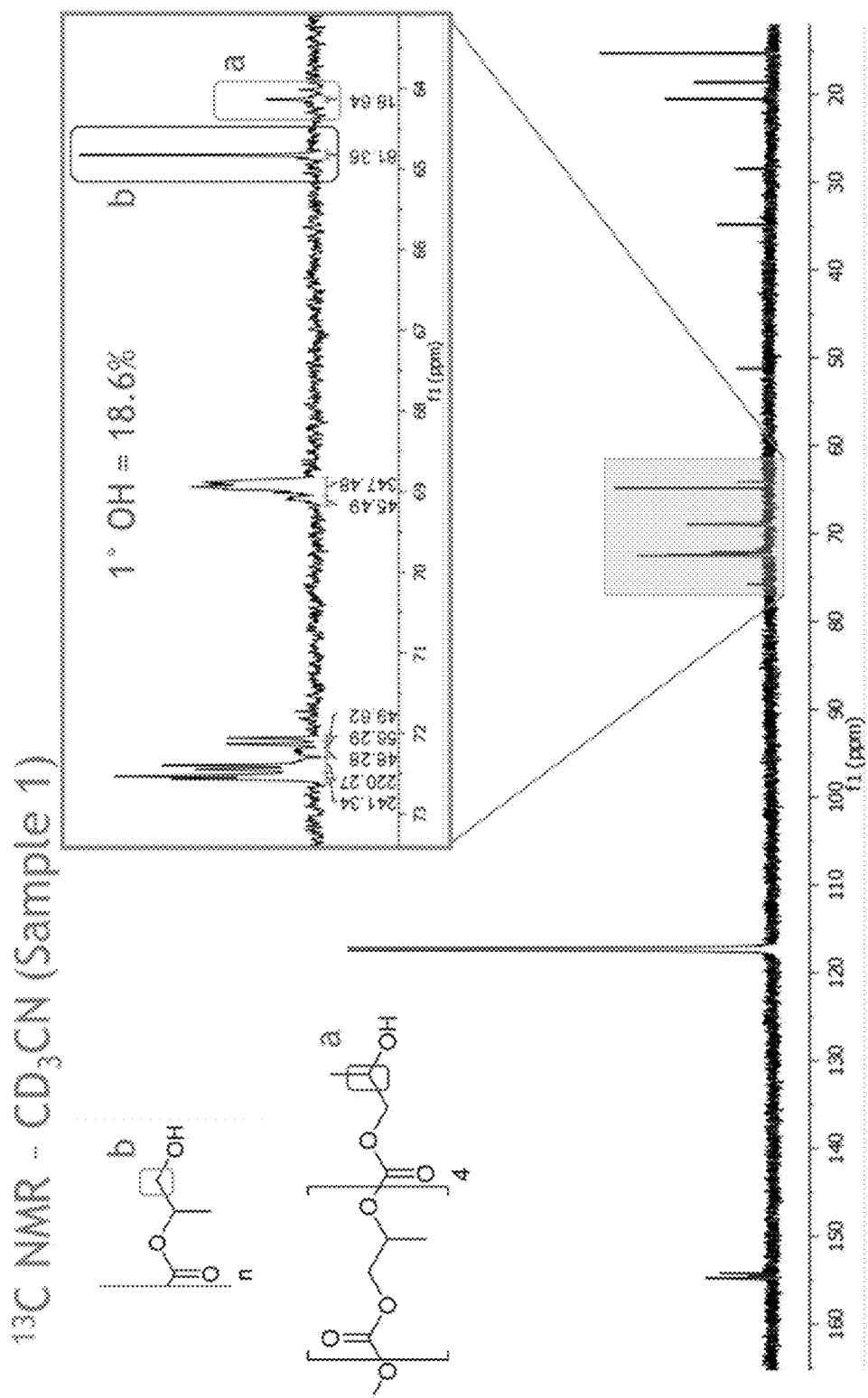
FIG. 10 is a $^{13}$C NMR spectrum of PPC Sample 1 in CD$_3$CN.
Figure 11:
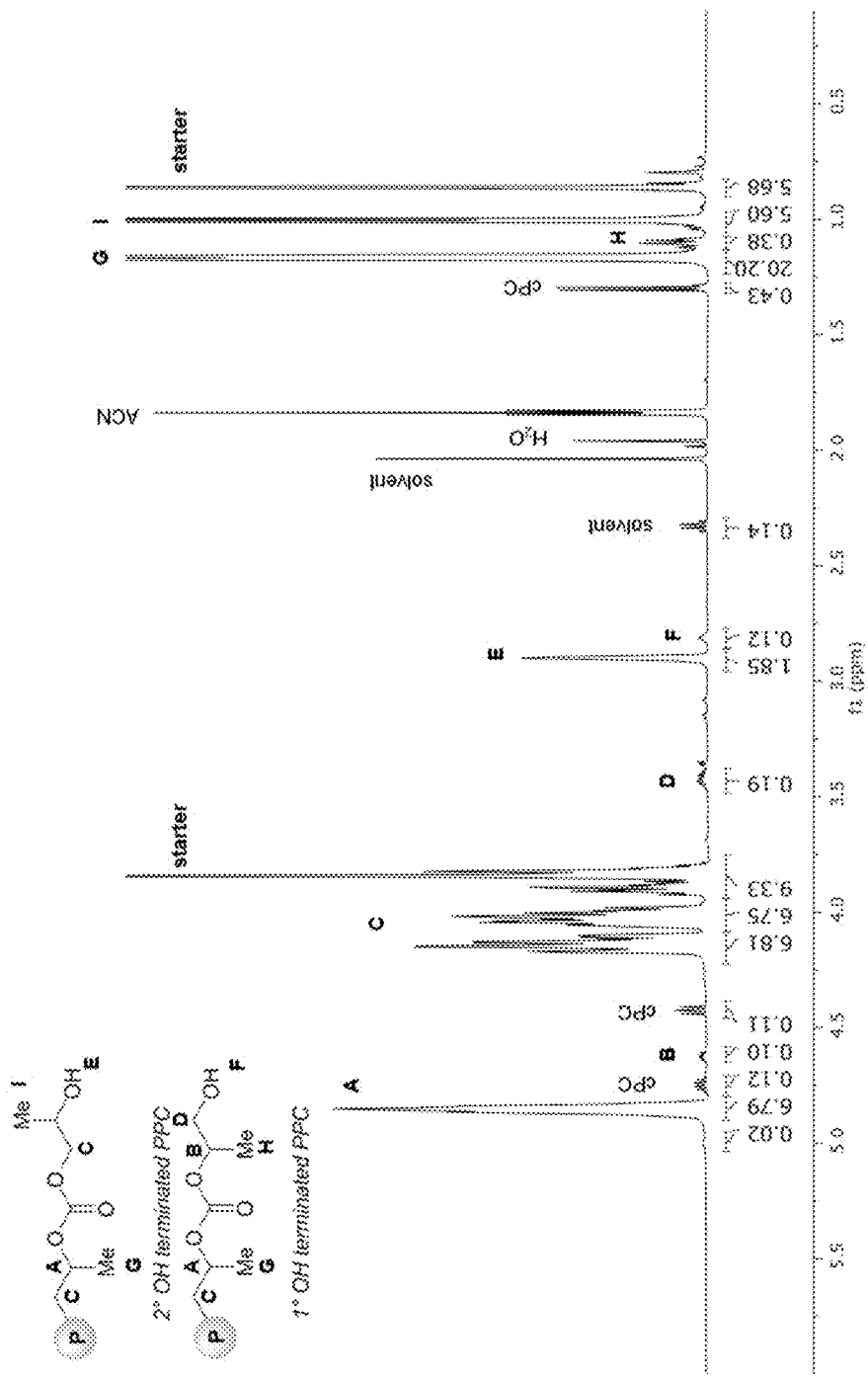
FIG. 11 is a $^1$H NMR spectrum of PPC Sample 2 in CD$_3$CN, illustrating primary (1° OH) and secondary (2° OH) terminated PPCs.

To provide context for changes of primary vs. secondary hydroxyl groups in a sample of poly(alkylene carbonate) polymers, samples of poly(propylene carbonate) polymers comprising mixtures of both primary and secondary hydroxyl end groups were characterized using known NMR methods. For example, Sample 1 (a poly(propylene carbonate) polymer comprising a mixture of polymers with primary and secondary hydroxyl end groups) was characterized by $^1$H COSY NMR spectrum in $CD_3CN$ (see FIG. 8), HSQC NMR in $CD_3CN$ (see FIG. 9), and $^{13}C$ NMR in $CD_3CN$ (see FIG. 10). The relevant functional groups are mapped onto their respective peaks in the spectrum by dotted or solid-lined boxes. Sample 2 (a poly(propylene carbonate) comprising a mixture of polymers with primary and secondary hydroxyl end groups) was characterized by $^1$H NMR in $CD_3CN$ to illustrate primary and secondary terminated PPCs (see FIG. 11).

Example 1

Temperature Effects on End Group Isomerization of Quenched and Filtered Poly(Propylene Carbonate).

Figure 2:
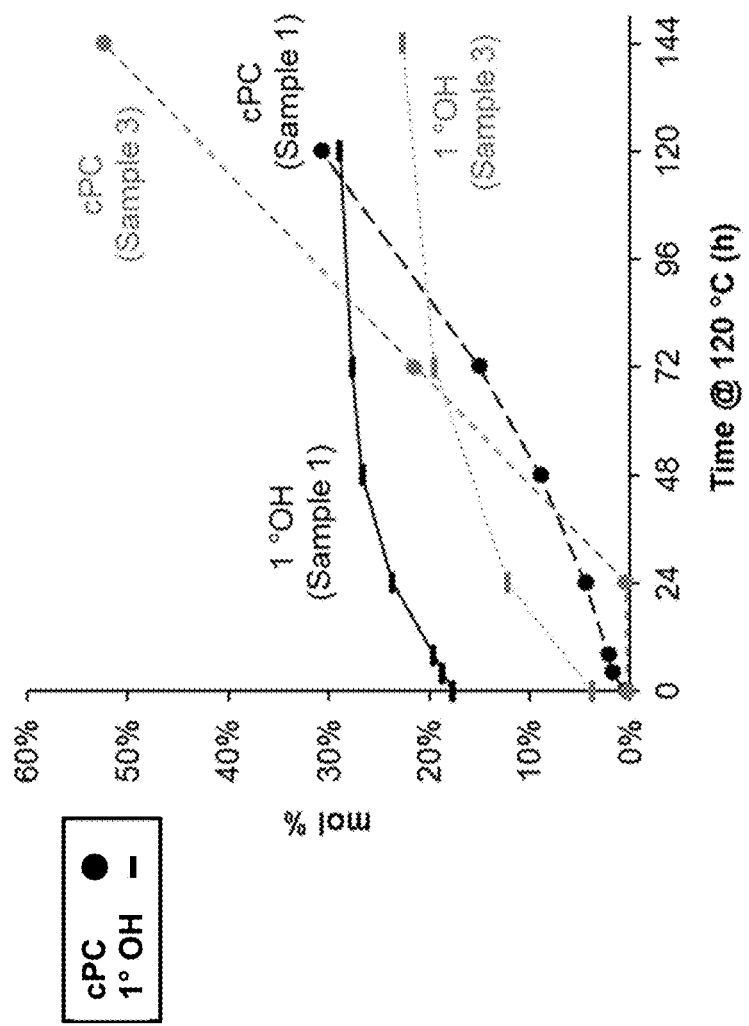
FIG. 2 is a scatter plot illustrating the change in the amounts of primary (1° OH) end groups and cyclic propylene carbonate (cPC) in two batches of poly(propylene carbonate) when heated to 120° C.

To test how heat impacts the presence of primary vs. secondary hydroxyl end groups in poly(alkylene carbonate) polymers, two batches of poly(propylene carbonate) (Sample 1 and Sample 3) were held at 120° C. in a convection oven and sampled over a period of days. The molar % of primary hydroxyl end groups was found to increase over time, as shown in FIG. 2.

It was observed that heating can cause the poly(propylene carbonate) polymer to degrade, generating cyclic propylene carbonate (cPC). A closer look at FIG. 2 reveals a non-linear increase in both cPC and primary hydroxyl end-groups. However, while the cPC concentrations continued to increase over time, the primary hydroxyl end-group content leveled off at 23-29% after about 3 days at 120° C.

Figure 3:
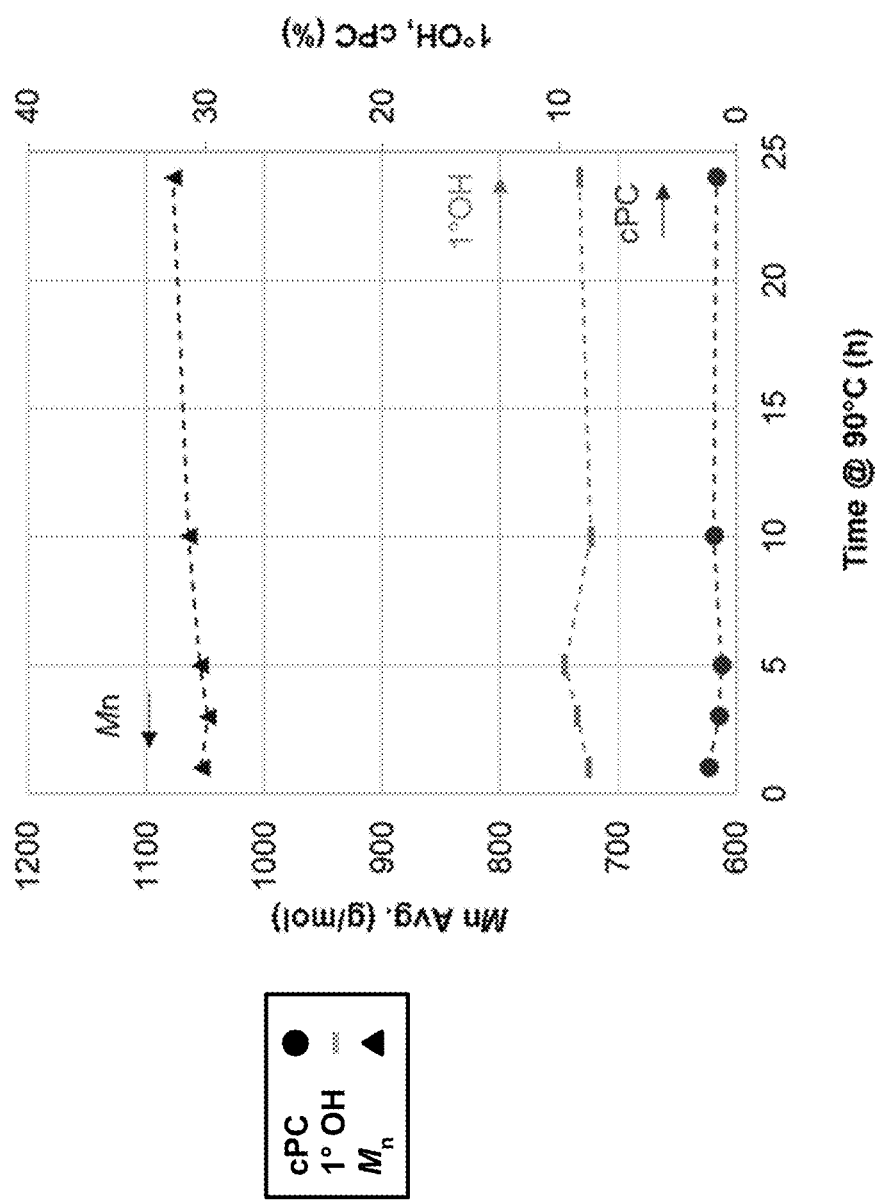
FIG. 3 is a scatter plot illustrating the change in the amounts of primary (1° OH) end groups and cPC in a composition of poly(propylene carbonate) when heated to 90° C.

After determining that heat promotes end-group isomerization, the processing temperatures (e.g., 80-100° C.) for increasing the 1° OH content were investigated. To this end, a sample of poly(propylene carbonate) polymer where the polymerization catalyst was quenched and filtered was held at 90° C. and sampled over the course of 24 hours (FIG. 3). This experiment revealed that the molecular weight, propylene carbonate content, and primary hydroxyl end-group ratio of the polyol did not significantly change (e.g. did not change by more than +/−5% of its starting value), thereby confirming that poly(propylene carbonate) polymer compositions where the polymerization catalyst was quenched and filtered are unlikely to isomerize under typical processing conditions (<24 hours at about 90° C.).

Example 2

Temperature Effects on End Group Isomerization of Unquenched and Unfiltered Poly(Propylene Carbonate).

This Example studied the effect on end group isomerization (i.e., OH end group rearrangement) of having an unquenched catalyst from the copolymerization reaction present during heating.

Varied Temperature and Short-Term Heating

Figure 4A:
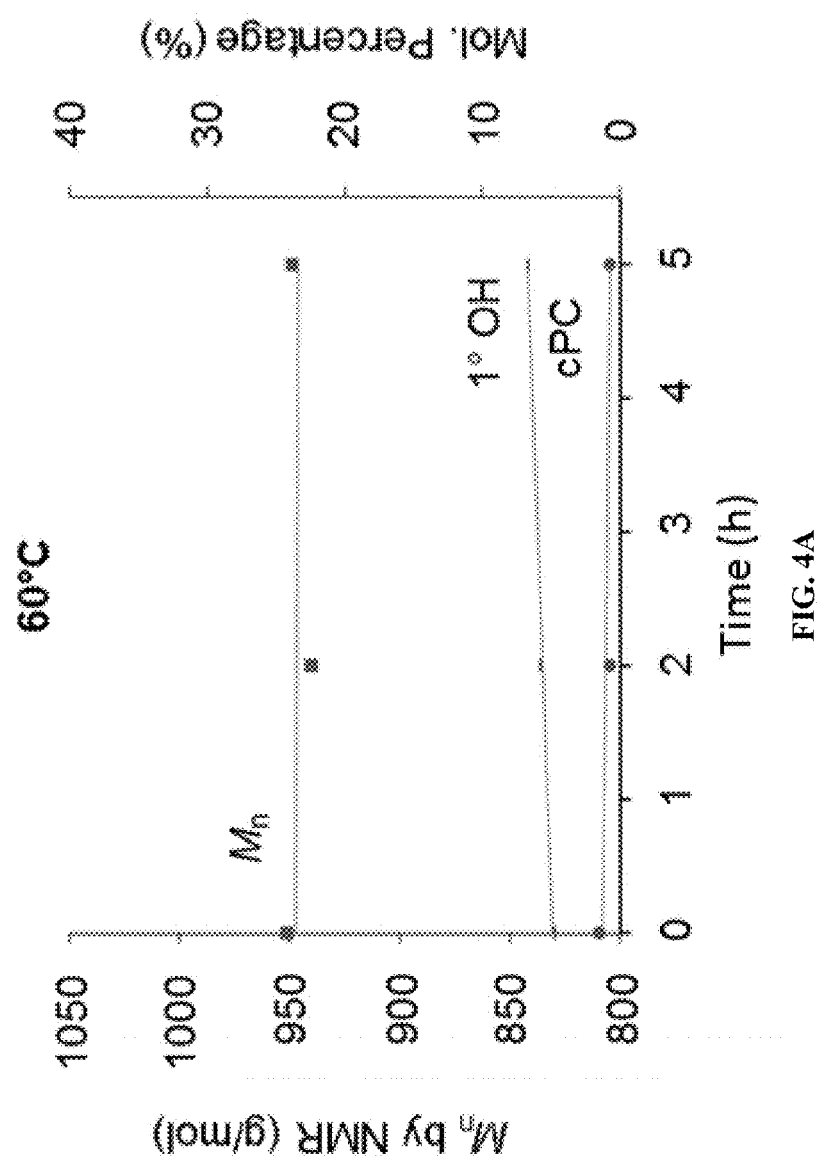
FIGS. 4A-C are scatter plots illustrating the change in the amounts of primary (1° OH) end groups and cPC in a composition of poly(propylene carbonate) when heated to 60° C.
Figure 4B:
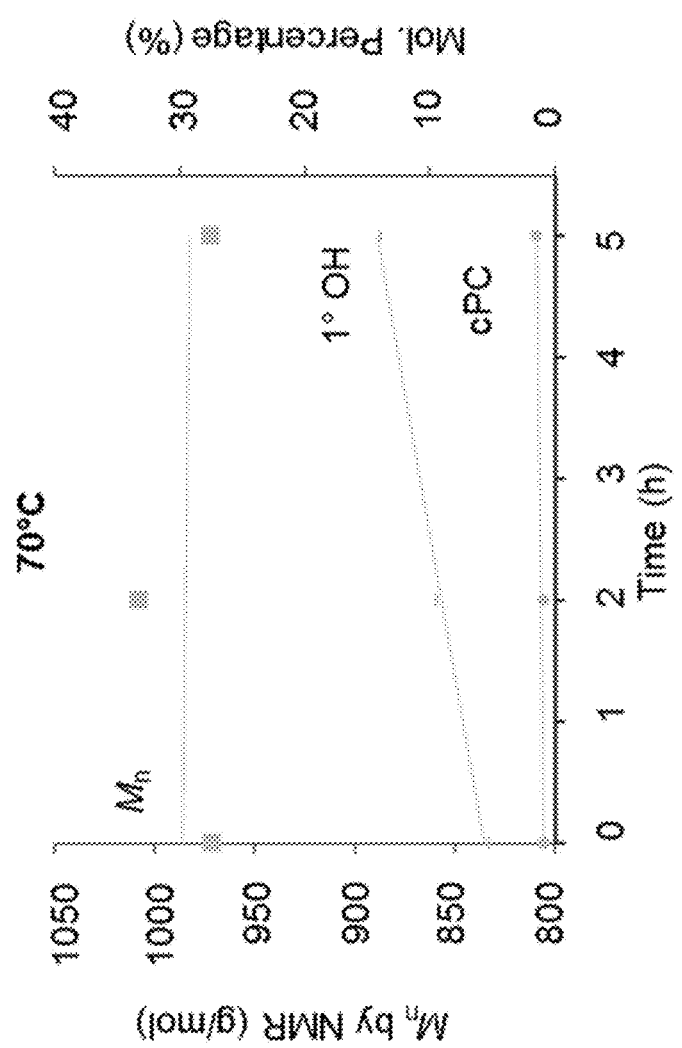
Figure 4C:
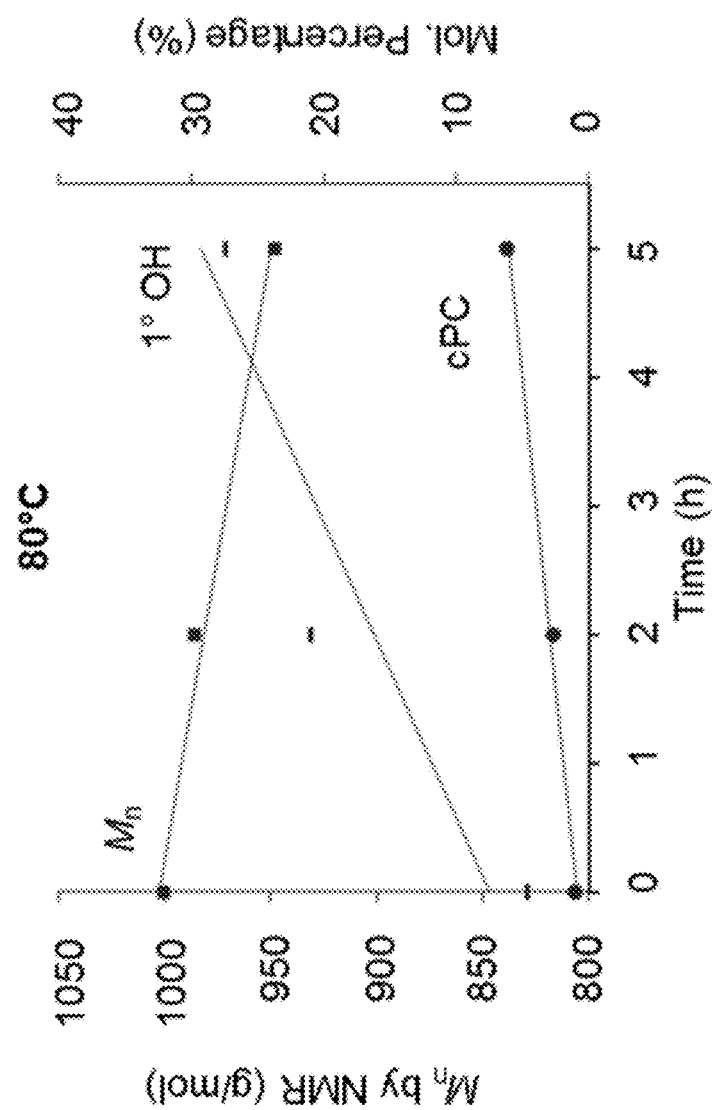

Three samples of poly(propylene carbonate) were prepared by copolymerization of $CO_2$ and propylene oxide using a metallosalenate catalyst to provide greater than 95% conversion to poly(propylene carbonate) having a molecular weight of about 1,000 g/mol. Each sample was held at a different temperature (60° C., 70° C., and 80° C.) for 5 hours. The results are reported in FIGS. 4a-c. As can be seen in FIG. 4a heating at 60° C. provided a modest increase in the molar amount of primary hydroxyl groups over 5 hours. Greater increases of primary hydroxyl groups are seen in the samples held at 70° C. (about 10% increase; see FIG. 4b) and 80° C. (about 20% increase; see FIG. 4c). The presence of cPC formation was noted in each sample.

Increased Temperature and Long-Term Heating

Figure 5:
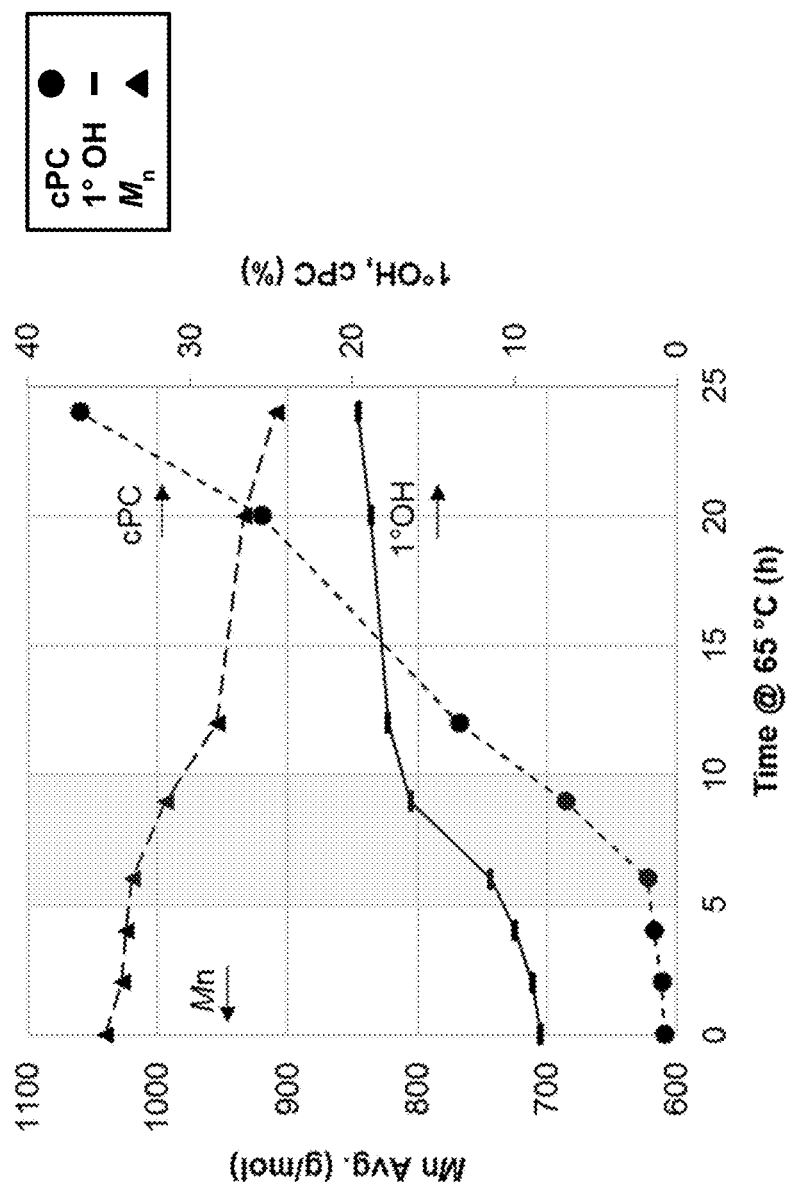
FIG. 5 is a scatter plot illustrating the change in the amounts of primary (1° OH) end groups and cPC in a composition of poly(propylene carbonate) when heated to 65° C.

Poly(propylene carbonate) was prepared by copolymerizing $CO_2$ and propylene oxide in the presence of a metallosalenate catalyst to high conversion (greater than 95%). The reaction vessel was then heated to 65° C. under $CO_2$ pressure and sampled periodically over 24 hours. The results are found in FIG. 5. Analysis of the unquenched aliquots at 65° C. resembled the results from FIG. 2 (quenched, 120° C.) but the presence of unquenched catalyst greatly accelerated the isomerization at the lower temperature. After 4 hours at 65° C., the isomerization initiated and continued at an accelerating rate up to about 10 hours. Thereafter, the primary OH concentration began to level off at around 18-20 mol %, compared to the initial 8% found in the starting poly(propylene carbonate). Within this range (the shaded band in FIG. 5), cPC only modestly increased from 1 to 6 mol %. If the isomerization was carried out for longer times (>10 hours) or at higher temperatures (90° C.), cyclic formation was the dominant reaction pathway with minimal increase in primary OH content (not shown).

Example 3

Temperature Effects on End Group Isomerization of Quenched and Unfiltered or Filtered Poly(Propylene Carbonate).

Figure 6:
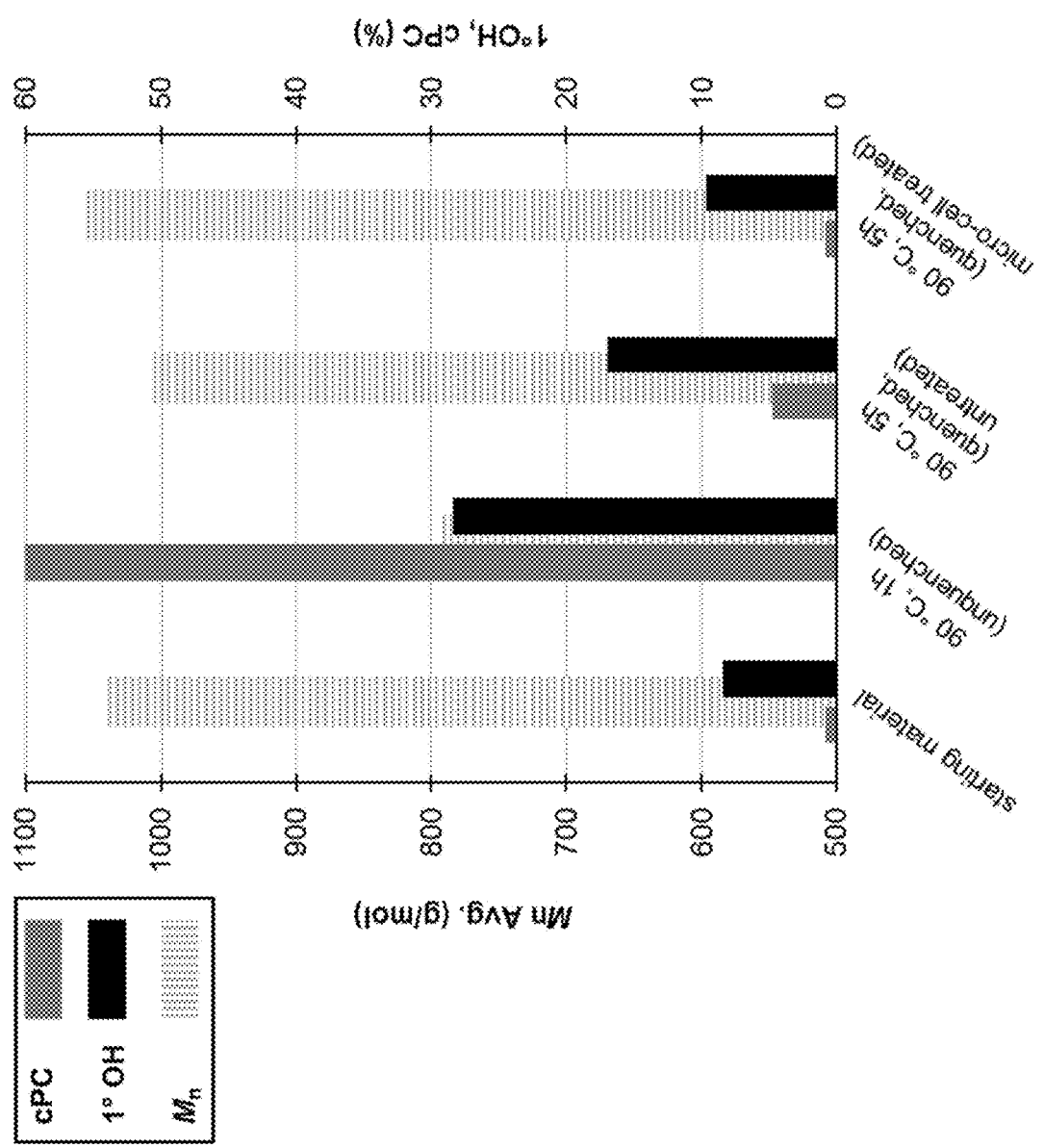
FIG. 6 is a bar graph illustrating the normalized molecular weight (Mn), and percent of composition comprising cPC or primary hydroxyl end groups present in three different samples (unquenched, quenched, and quenched and filtered).
Figure 7:
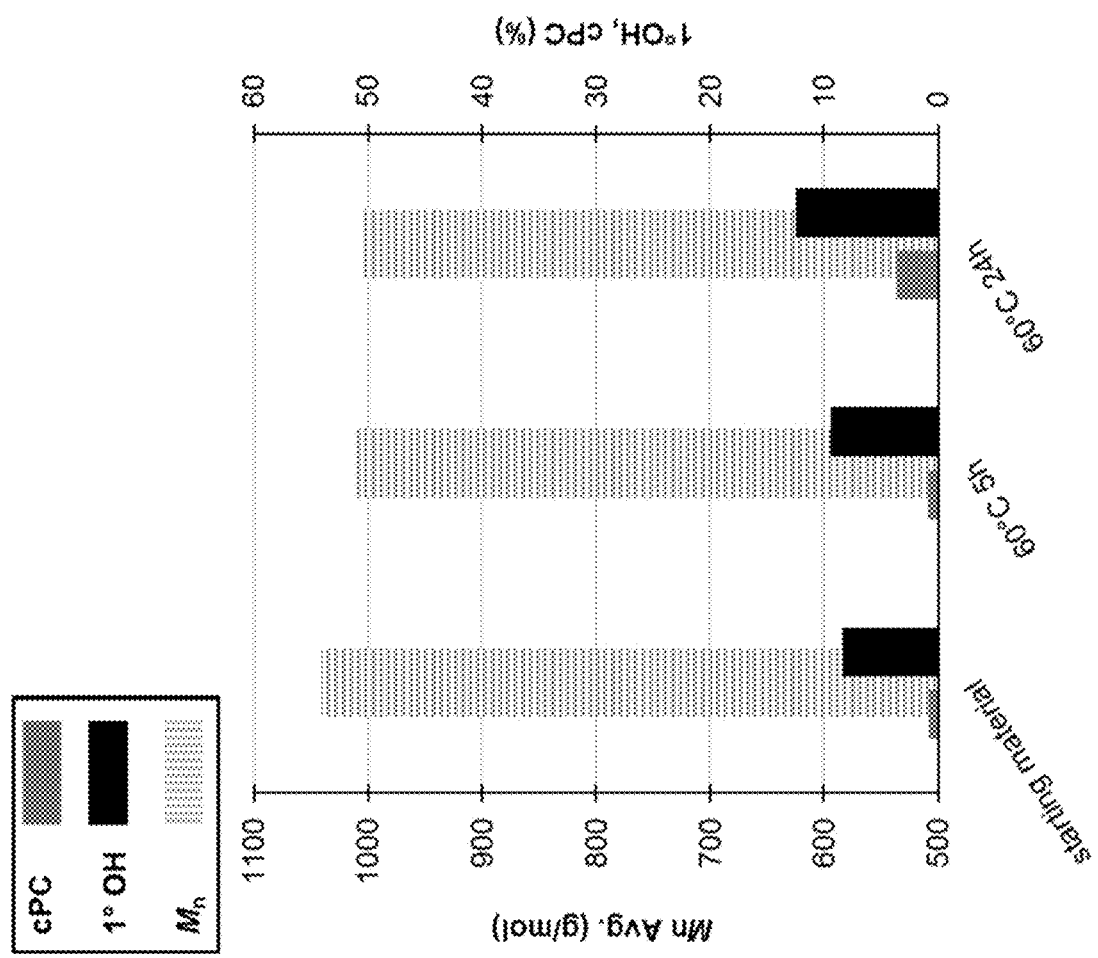
FIG. 7 is a bar graph illustrating the normalized molecular weight (Mn), and percent of composition comprising cPC or primary hydroxyl end groups present in a batch of poly (propylene carbonate) polymer initially, at 5 h, and at 24 h when heated to 60° C.

To investigate the effects of quenched catalyst residue, a PPC polymerization was run to high conversion and then quenched with 4 equiv. of $H_3PO_4$ (relative to catalyst). Samples were withdrawn pre- and post-quench, stripped of volatiles under reduced pressure, and then held at 60° C. or 90° C. to assess their stability and rate of isomerization (FIG. 6). In the quenched sample held at 90° C., the primary OH content had increased to 17% (from 8%) and cPC increased to 5% (from 1%) within 5 hours. By 24 hours at 90° C., this sample had substantially depolymerized (as evidenced by the presence of >30% cPC (data not shown)). Samples held at 60° C. behaved similarly but the isomerization and depolymerization were significantly slower, with 12% 1° OH and 4% cPC after 24 hours (see FIG. 7).

However, if the quenched samples were treated with celite (Micro-Cel™ C) and filtered followed by heating for 24 hours at 90° C., there was virtually no change in the ratio of primary hydroxyl to secondary hydroxyl groups.

In summary, temperature, time, and catalyst residue are three underlying factors governing the end-group isomerization of PPC polyols. Table 1 summarizes experiments described in Examples 1-3.

TABLE 1

|  | 65° C. | 90° C. | 120° C. |
|---|---|---|---|
| Unquenched | 5-10 h | <1 h | <1 h |
| Quenched, unfiltered | 22-27 h | 2-7 h | — |
| Quenched, filtered | — | — | 22-27 h |

Example 4

Identification of Isomerization Catalysts

Figure 12:
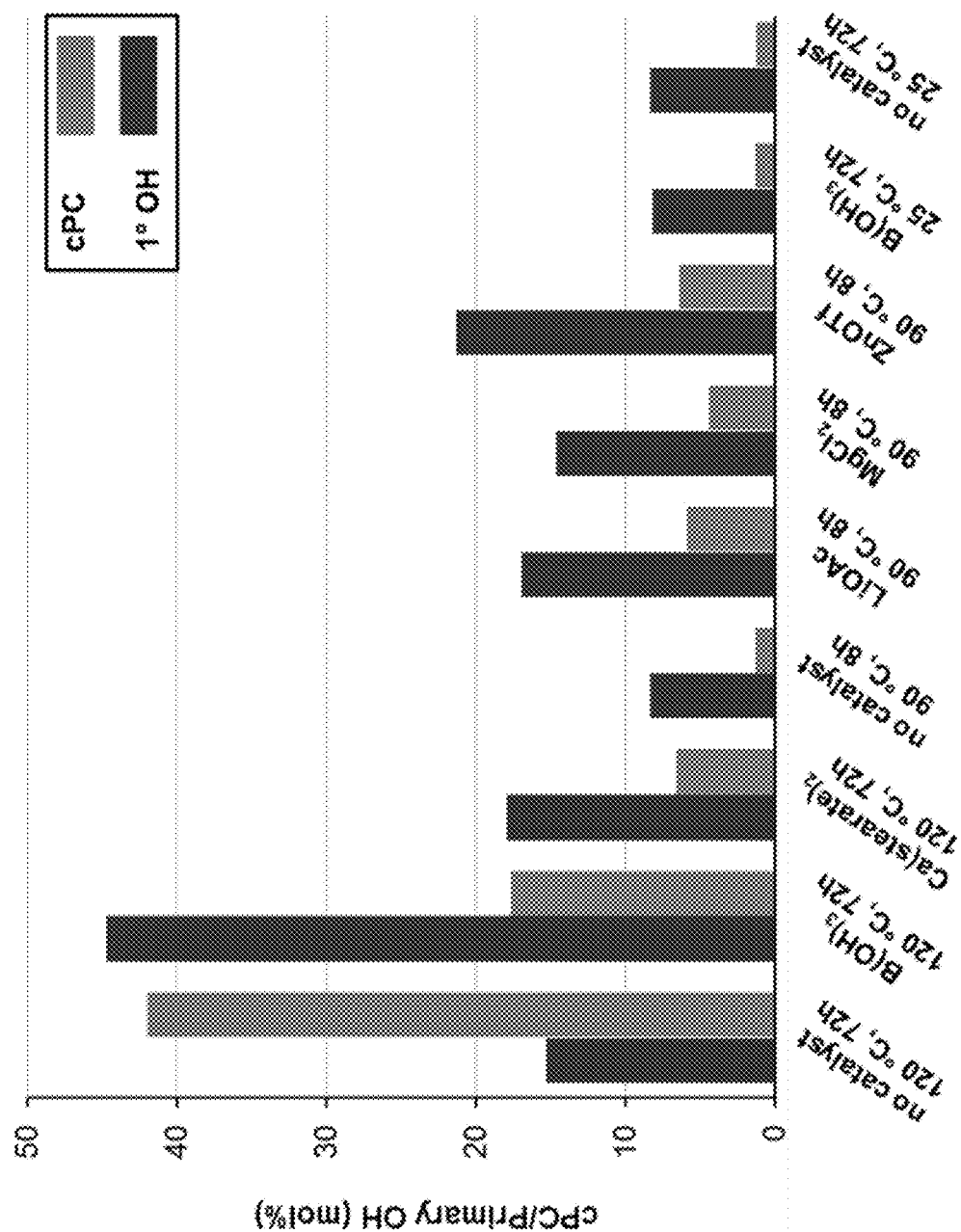
FIG. 12 is a graph depicting the results of the isomerization catalyst screen, where the x-axis depicts the catalyst and temperature tested, and the y-axis depicts the mol % of cPC and primary OH end groups of the modified PPC polymer composition.

To determine the effect of certain catalysts on PPC polymer compositions, a screening of certain isomerization catalysts was performed. 1 g of starting PPC polymer composition (having Mn of 2573 g/mol (measured by GPC); Đ of 1.06 (measured by GPC); 3.0 ppm of residual Co; average number of OH groups=61, cPC (starting wt %)=2%, 10 OH (mol %)=8%) was combined with 50 mg of catalyst (5 wt %) in a 20 mL glass vial and heated to 90° C. After 10 minutes, the vial was removed and manually stirred with a spatula until catalyst was well mixed. The reaction mixture was then heated to the target temperature 90° C. or 120° C. for the indicated time. The results of the screen are reported in FIG. 12. The amount of primary OH groups (mol %) was found to increase for all catalysts when heated to 90° C. or 120° C. A control reaction was run having no catalyst and heating the starting PPC polymer to 90° C. The amount of primary OH end groups did not noticeably change.

Figure 13:
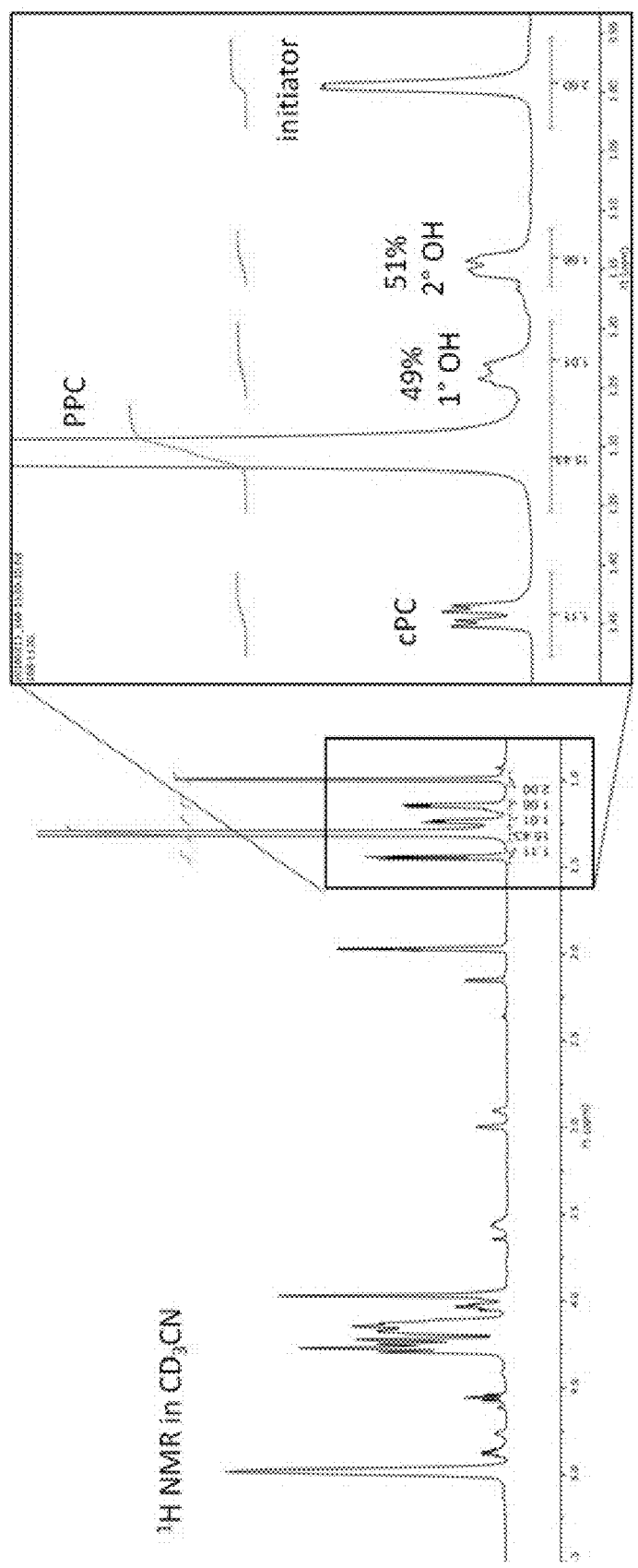
FIG. 13 is a $^1$H NMR spectrum of a modified PPC polymer composition after reacting with boric acid.

The reaction of the starting PPC polymer composition with boric acid was analyzed by $^1$H NMR (see FIG. 13). The NMR spectrum illustrates the increase from 8% to about 49% of primary OH end groups.

Figure 14A:
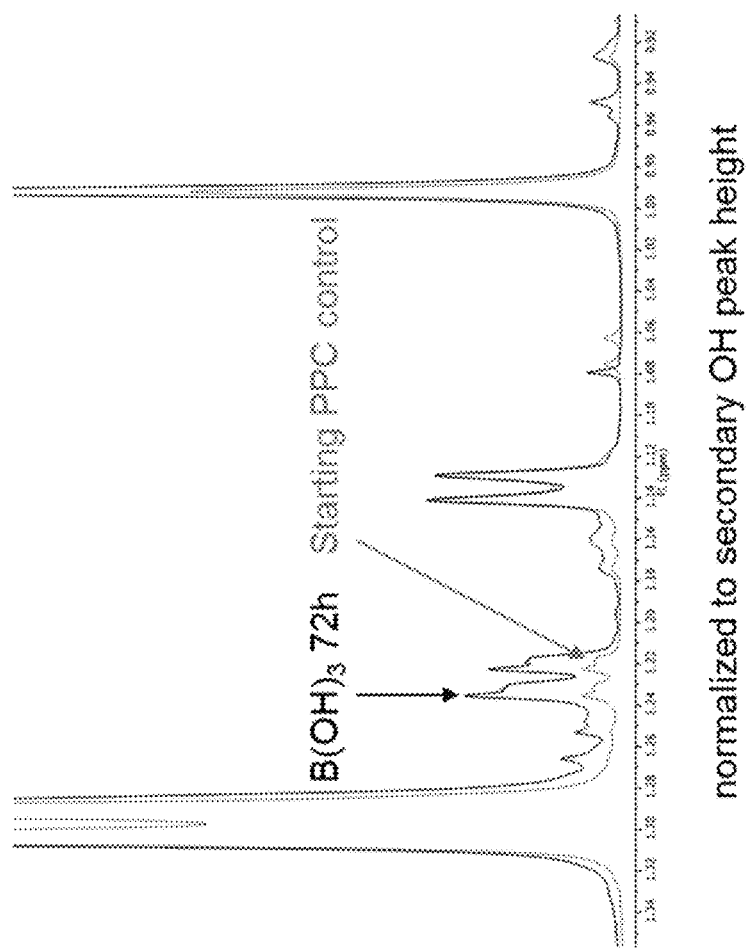
FIGS. 14A and 14B are $^1$H NMR spectra of a modified PPC polymer composition and a starting PPC polymer composition, wherein the modified PPC polymer composition has reacted with boric acid for 72 hours.

FIG. 14A is a $^1$H NMR spectrum overlaying the modified PPC polymer composition with the starting PPC polymer composition. The spectra are normalized such that the peak size of the secondary OH groups are the same. This illustrates that the ratio of primary to secondary OH end groups has increased in the modified PPC polymer.

Figure 14B:
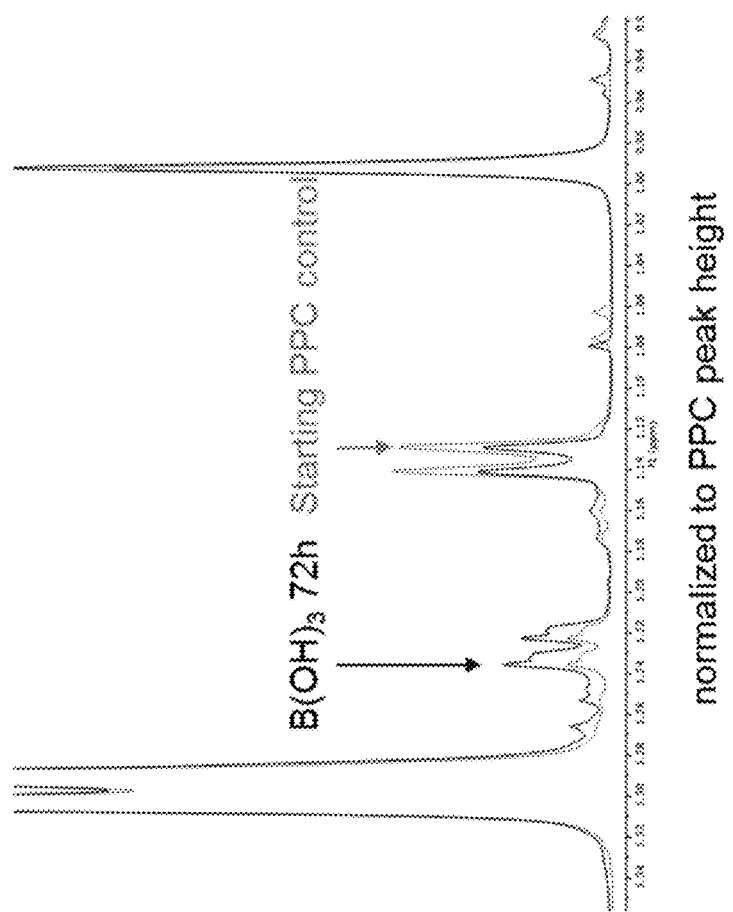

FIG. 14B is a $^1$H NMR spectrum overlaying the modified PPC polymer composition with the starting PPC polymer composition. The spectra are normalized with respect to the peak size of the PPC moieties. This illustrates that the number of secondary OH end groups has decreased and the number of primary OH end groups has increased.

OTHER EMBODIMENTS

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

The invention claimed is:

1. A method for increasing the ratio of primary to secondary OH end groups of a poly(propylene carbonate) ("PPC") polymer composition, the method comprising steps of copolymerizing propylene oxide and $CO_2$ in the presence of a copolymerization catalyst to form a reaction mixture comprising unquenched copolymerization catalyst and a starting PPC polymer composition, heating the reaction mixture comprising unquenched copolymerization catalyst and the starting PPC polymer composition to provide a reaction mixture comprising the unquenched copolymerization catalyst and a modified PPC polymer composition, wherein the modified PPC polymer composition has a higher ratio of primary to secondary OH end groups relative to the starting PPC polymer composition; and contacting the reaction mixture comprising unquenched copolymerization catalyst and the modified PPC polymer composition with a quenching agent suitable to end the copolymerization reaction.

2. The method of claim 1, comprising heating the reaction mixture comprising unquenched copolymerization catalyst and starting PPC polymer composition to a temperature in the range of about 50° C. to about 85° C.

3. The method of claim 1, wherein the starting PPC polymer composition has an Mn of about 500 to about 30,000 g/mol.

4. The method of claim 1, wherein the molar percent of primary OH end groups in the modified PPC polymer composition is at least 15%, at least 20%, at least 25%, at least 30%, at least 35%, at least 40%, at least 45%, at least 50%, at least 51%, at least 70%, at least 75%, at least 80%, at least 85%, at least 90%, or at least 95% greater than the molar percent of primary OH end groups in the starting PPC polymer.

5. The method of claim 1, wherein the ratio of primary OH end groups to secondary OH end groups in the modified PPC polymer composition is at least 75%, at least 100%, at least 150%, at least 200%, at least 300%, at least 400%, or at least 500% greater than the ratio of primary OH end groups to secondary OH end groups in the starting PPC polymer composition.

6. The method of claim 1, comprising venting the $CO_2$ from the reaction mixture prior to the heating step.

7. The method of claim 1, wherein the quenching agent is added to the reaction mixture after the ratio of primary to secondary OH end groups has increased to a desired level and/or by a desired amount.

8. The method of claim 1, wherein an amount of cyclic propylene carbonate ("cPC") formed during the heating step is less than about 10 weight percent, about 9 weight percent, about 8 weight percent, about 7 weight percent, about 6 weight percent, about 5 weight percent, about 4 weight percent, about 3 weight percent, about 2 weight percent, or about 1 weight percent relative to the starting PPC polymer.

9. The method of claim 1, wherein the heating step is performed in a continuous flow format.

10. The method of claim 9, further comprising drawing the starting PPC composition from a feed reservoir, flowing the PPC through a heated zone and accumulating the modified PPC composition in a product reservoir.

11. The method of claim 8, further comprising the step of removing cPC.

12. The method of claim 11, wherein the cPC is removed continuously during the heating step.

13. The method of claim 12, wherein the removal of the cPC during the heating step is facilitated by reduced pressure.

14. The method of claim 12, wherein the removal of the cPC during the heating step is facilitated by a gas flow.

15. The method of claim 4, wherein the molar percent of primary OH end groups in the modified PPC polymer composition is about 35% greater than the molar percent of primary OH end groups in the starting PPC polymer.

16. The method of claim 4, wherein the molar percent of primary OH end groups in the modified PPC polymer composition is at least 45% greater than the molar percent of primary OH end groups in the starting PPC polymer.

17. The method of claim 4, wherein the molar percent of primary OH end groups in the modified PPC polymer composition is at least 70%, at least 75%, at least 80%, at least 85%, at least 90%, or at least 95% greater than the molar percent of primary OH end groups in the starting PPC polymer.

18. The method of claim 4, wherein the molar percent of primary OH end groups in the starting PPC polymer composition is less than 15%, less than 10%, less than 8%, less than 5%, or less than 3%, or less than 2%.

19. The method of claim 1, wherein the molar percent of primary and secondary OH end groups is determined by $^1$H NMR.

20. The method of claim 8, wherein the molar percent of the cPC is determined by NMR.

21. The method of claim 1, comprising heating the reaction mixture comprising unquenched copolymerization catalyst and starting PPC polymer composition to a temperature in the range of about 50° C. to about 70° C.

22. The method of claim 1, comprising heating the reaction mixture comprising unquenched copolymerization catalyst and starting PPC polymer composition to a temperature of about 65° C.

* * * * *